(12) United States Patent
Morche et al.

(10) Patent No.: US 7,852,973 B2
(45) Date of Patent: Dec. 14, 2010

(54) METHOD AND A DEVICE TO COMPENSATE FOR IMBALANCES IN A RECEIVER

(75) Inventors: Dominique Morche, Meylan (FR); Cedric Dehos, Douarnenez (FR)

(73) Assignee: Commissariat A l' Energie Atomique, Paris (FR)

(*) Notice: Subject to any disclaimer, the term of this patent is extended or adjusted under 35 U.S.C. 154(b) by 687 days.

(21) Appl. No.: 11/720,000

(22) PCT Filed: Nov. 21, 2005

(86) PCT No.: PCT/FR2005/050972

§ 371 (c)(1),
(2), (4) Date: May 23, 2007

(87) PCT Pub. No.: WO2006/090033

PCT Pub. Date: Aug. 31, 2006

(65) Prior Publication Data
US 2008/0002795 A1    Jan. 3, 2008

(30) Foreign Application Priority Data
Nov. 23, 2004  (FR) .................................. 04 12417

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04K 1/10* (2006.01)
*H04L 27/28* (2006.01)

(52) U.S. Cl. .......................... 375/346; 375/260
(58) Field of Classification Search .................. 375/346
See application file for complete search history.

(56) References Cited

U.S. PATENT DOCUMENTS
5,263,196 A    11/1993   Jasper (Continued)

FOREIGN PATENT DOCUMENTS
DE           19948383         4/2001

(Continued)

OTHER PUBLICATIONS

Vincent K.P. Ma and T. Ylamurto; "Analysis of IQ Imbalance on Initial Frequency Offset Estimation in Direct Down Conversion Receivers"; IEEE Workshop on Wireless Communications; Mar. 20, 2001, pp. 158-161; Piscataway, USA.

(Continued)

*Primary Examiner*—David C Payne
*Assistant Examiner*—Erin M File
(74) *Attorney, Agent, or Firm*—Pearne & Gordon LLP

(57) ABSTRACT

The invention concerns a method for the correction of the IQ imbalance of a receiver, in order to obtain a corrected estimate of the IQ imbalance, including:
  a step for estimating IQ imbalance according to imbalance residual variations since a preceding estimate of the IQ imbalance,
  a step correcting frequency and clock offsets,
  a step for correcting the IQ imbalance according to the estimate of the imbalance, in order to obtain a corrected estimate of the IQ imbalance.

53 Claims, 9 Drawing Sheets

U.S. PATENT DOCUMENTS

| | | | |
|---|---|---|---|
| 5,396,656 | A | 3/1995 | Jasper et al. |
| 6,653,958 | B1 | 11/2003 | Morche |
| 7,016,426 | B1 | 3/2006 | Balz et al. |
| 7,184,714 | B1 * | 2/2007 | Kutagulla et al. ............ 455/73 |
| 2003/0095589 | A1 | 5/2003 | Jeong |
| 2004/0156450 | A1 * | 8/2004 | Auranen et al. ............ 375/324 |
| 2005/0041725 | A1 | 2/2005 | De Rivaz et al. |
| 2005/0201270 | A1 * | 9/2005 | Song et al. ................. 370/208 |
| 2005/0220187 | A1 | 10/2005 | Delorme et al. |
| 2005/0249312 | A1 * | 11/2005 | Bode et al. ................. 375/308 |
| 2006/0056554 | A1 * | 3/2006 | Lin et al. ................... 375/350 |

FOREIGN PATENT DOCUMENTS

| | | |
|---|---|---|
| DE | 10241679 | 3/2004 |
| EP | 1339197 | 8/2003 |
| EP | 1624636 | 8/2004 |
| WO | 03-003686 | 1/2003 |
| WO | 03-101064 | 12/2003 |

OTHER PUBLICATIONS

Andreas Shuchert; "Verfahren der digitslen Kompensation von Unsymmetrien der analogen Quadraturmischung in OFDM-Emphangern"; Vom Fachbereich Elektrotechnik und Informationstechnik der Bergischen Universitaet-Gesamthochschle Wuppertal Angenommeme Dissertation Zur Erlangung des Akadepischen Grades Eines Doktor-Ingenieurs; 2001, pp. 0-141.

Jan Tubbax et al.; "Compensation of IQ Imbalance and Phase Noise in OFDM Systems" IEEE Transactions on Wireless Communications, vol. 4, No. 3; May 2005.

Jan Tubbax et al.; "Joint Compensation of IQ Imbalance and Phase Noise" IEEE; 2003, pp. 1605-1609.

* cited by examiner

METHOD AND A DEVICE TO COMPENSATE FOR IMBALANCES IN A RECEIVER

TECHNICAL FIELD AND PRIOR ART

The invention concerns the field of signal processing.

It applies to radio receivers in general.

It concerns in particular frequency and clock synchronisation and channel estimate of multi-carrier reception systems, in the presence of imbalances of gain and phase between the paths in phase and in phase quadrature.

FIG. 1A represents a transmitter (emitter) 2, that includes signal generating means 4, frequency transposition means 6, filtration means 8, 12, amplification means 10, and an antenna 14.

FIG. 1B represents a receiver 20, that includes an antenna 21, filtration means 22, 24, and amplification means 23. Reference 25 indicates a local oscillator, references 26 and 28 are mixers, respectively followed by filters 27, 29, and all of these means 25 to 29 form frequency transposition means. An analogue signal processed by these means is then digitised by digitising means 30 and digital processing means 32, to produce a signal 34.

Many wireless communication systems now convey or will convey information on several orthogonal subcarriers.

This is the case of the systems called OFDM and MC-CDMA, which offer a good strength to multipath propagation channels, and to selective fading.

The receivers that use this orthogonal frequency multiplexing no longer function correctly when there is a frequency or clock offset between the transmitter and the receiver.

These systems are also sensitive to imbalances of gain and phase between the paths in phase and phase quadrature in the receiver. The superimposition of these distorting elements generates inter-carrier interference and renders demodulation particularly difficult.

It is possible to evaluate the degradations undergone by frequency-defined sequences (pilots or "learning sequences") at the transmission step in multicarrier systems.

We begin by calculating the effect of the frequency and clock offset at the FFT output.

Let $[X_{-K}, \ldots, X_{-1}, X_1, \ldots, X_K]$ be the coded signal to be transmitted on the 2K OFDM subcarriers.

At transmission, the temporal signal at the IFFT output is given by:

$$x_n = \frac{1}{2K} \sum_{k=-K}^{K} X_k e^{j*2\pi*\frac{k*n}{2K}}$$

At the output of the gaussian channel, and after transposition to baseband, the signal affected by the frequency offset $\Delta f$ and clock offset $\delta t$, becomes:

$$y_n = \frac{1}{2K} \sum_{k=-K}^{K} X_k H_k e^{j*2\pi(k+\Delta fT)\frac{(1+\frac{\delta t}{T})n}{2K}} + w_n$$

where T is the symbol period, with coefficients $H_k$ being representative of the propagation channel, and where $w_n$ refers to added noise.

After passage in the FFT step (Fast Fourier Transform), we get:

$$Y_p = \frac{1}{2K} \sum_{n=-K}^{K} \sum_{k=-K}^{K} X_k H_k e^{j*2\pi \frac{(k+\Delta fT)(1+\frac{\delta t}{T})-p}{2K}n} + W_p$$

where $W_p$ refers to added noise.

It is possible to make the following simplifying assumptions: $\Delta f.\delta t \ll \delta t$ Making the substitution and expanding we get:

$$Y_p = X_p H_p \frac{\sin\left(\pi\left(\Delta fT + p\frac{\delta t}{T}\right)\right)}{2K \sin\left(\frac{\pi\left(\Delta fT + p\frac{\delta t}{T}\right)}{2K}\right)} e^{j*2\pi*\frac{2K-1}{2K}\left(\Delta fT + p\frac{\delta t}{T}\right)} +$$

$$\sum_{\substack{k=-K \\ k \neq p}}^{K} X_k H_k \frac{\sin\left(\pi\left(k - p + \Delta fT + k\frac{\delta t}{T}\right)\right)}{2K \sin\left(\frac{\pi\left(k - p + \Delta fT + k\frac{\delta t}{T}\right)}{2K}\right)} e^{j*2\pi*\frac{2K-1}{2K}\left(k - p + \Delta fT + k\frac{\delta t}{T}\right)} + W_p$$

The signal, thus affected by a frequency and clock offset experiences a phase shift, a change in gain, and the appearance of inter-carrier interference.

In the presence of IQ imbalances, the inter-carrier interference is further accentuated. We can model the composition of these imperfections by a block of frequency and clock offsets followed by a block of IQ imbalances. At the FFT output, the expression becomes:

$$Y_p = \left(\alpha \cdot X_p H_p e^{j*2\pi*\frac{2K-1}{2K}\left(\Delta fT + p\frac{\delta t}{T}\right)} + \beta \cdot X_p^{*m} H_p^{*m} e^{-j*2\pi*\frac{2K-1}{2K}\left(\Delta fT + p\frac{\delta t}{T}\right)}\right)$$

$$\frac{\sin\left(\pi\left(\Delta fT + p\frac{\delta t}{T}\right)\right)}{2K \sin\left(\frac{\pi\left(\Delta fT + p\frac{\delta t}{T}\right)}{2K}\right)} +$$

$$\alpha \sum_{\substack{k=-K \\ k \neq p}}^{K} X_k H_k \frac{\sin\left(\pi\left(k - p + \Delta fT + \frac{\delta t}{T}\right)\right)}{2K \sin\left(\pi \frac{k - p + \Delta fT + \frac{\delta t}{T}}{2K}\right)} e^{j*2\pi*\frac{2K-1}{2K}\left(k - p + \Delta fT + \frac{\delta t}{T}\right)} +$$

$$\beta \sum_{\substack{k=-K \\ k \neq p}}^{K} X_k^{*m} H_k^{*m} \frac{\sin\left(\pi\left(k - p + \Delta fT + \frac{\delta t}{T}\right)\right)}{2K \sin\left(\pi \frac{k - p + \Delta fT + \frac{\delta t}{T}}{2K}\right)} e^{-j*2\pi*\frac{2K-1}{2K}\left(k - p + \Delta fT + \frac{\delta t}{T}\right)} +$$

$$W_{2p}$$

where *m refers to the conjugate mirror subcarrier, and where $\alpha$ and $\beta$ are the parameters of the IQ imbalances.

When such distorting elements are superimposed, the channel estimate and equalisation algorithms are biased, and the IQ imbalances estimate and compensation systems are damaged.

FIGS. 2A and 2B represent diagrams of compensation devices as described in document WO03/101064.

In this document, an IQ imbalance correction and a frequency offset correction are carried out jointly from continuous-frequency OFDM pilots. The principle of the IQ imbalances correction is based upon a channel estimate frequency "smoothing".

According to the estimated frequency offset, the IQ imbalances evaluation is carried out by an algorithm in the frequency domain (IQ-FD) or the time domain (IQ-TD) and compensated at a later step, as illustrated respectively in FIGS. 3 and 5 of this document.

This switching from one algorithm to the other allows one to reduce the complexity of the calculations by dispensing with the interference terms between subcarriers.

The implantation of these two algorithms, and their switching, is complex to implement however. For a hardware system, two circuits are necessary, and this occupies space on a chip. For a software system, two programs are necessary, occupying space in memory.

In addition, data compensation requires one to be in possession of estimates of the frequency offset and of the IQ imbalances, after processing the learning sequences (including FFT). This can give rise to a latency period during which the data are waiting for these estimates.

Moreover, channel estimate needs to be corrected according to these estimates, and this increases the complexity.

It is possible finally to criticise this algorithm on the grounds of a lack of flexibility: it is necessary to have two learning sequences in succession in order to effect the frequency offset estimate, and of the IQ imbalances in the case of a large frequency offset (the IQ-TD algorithm). These long consecutive learning sequences are not always available in the current telecommunication standards.

This therefore raises the problem of finding a method to measure or estimate the IQ imbalances in the presence of a frequency offset between the transmitter and receiver, which does not have the limitations of the prior art described above.

PRESENTATION OF THE INVENTION

This present invention allows one to remedy these drawbacks.

The invention concerns a method for correction of the IQ imbalances estimate of a receiver, called the preceding estimate, in order to obtain a corrected IQ imbalance, in which the correction is carried out according to the imbalance residual variations since said preceding estimate.

According to the invention, we effect:
an estimate of the correction of the IQ imbalance estimate, according to imbalance residual variations,
a correction of the frequency and/or clock offsets, and of the IQ imbalance, according to the estimate of the imbalance, in order to obtain a corrected IQ imbalance or a corrected estimate of the IQ imbalance.

The method according to the invention requires no placing in memory of signals, and generates no latency period.

The IQ imbalances estimate is conducted by means of an adaptive algorithm, from a new criterion that is not very sensitive to the frequency offsets.

This offers a robust solution, as well as flexibility in use. Only one algorithm is necessary, whatever the frequency domain. It also functions from pilots or from learning sequences that are not necessarily consecutive.

Finally, channel estimate soon needs no further correction: the correction takes place upstream of the fast Fourier transform operation, or during this operation, but not directly on the channel estimating operation.

On the contrary, the processes described in document WO03/101064 firstly draw the imbalance estimate parameters from the channel estimate, and secondly also require a channel estimate correction.

IQ imbalances compensation can be carried out from continuous frequency pilots that are not necessarily consecutive.

The IQ imbalance estimate can be carried out from pilots, or learning sequences, which give rise to transitions due to the opposite IQ imbalances.

Thus, with such pilots, given that the interference generated by an IQ imbalance can be added to or subtracted from the complex received signal according to the sign of the ratio between the transmitted OFDM symbol and its mirror part, with the transitions due to the IQ imbalances being opposite, the IQ imbalances correction is improved.

The IQ imbalance estimate can be carried out from two pilots, or learning sequences.

The IQ imbalance estimate can be carried out, for example, from two pilots or learning sequences, $p_1$ and $p_2$, with $p_1$ being composed of a pseudo-random sequence for example, and $p_2$ being identical to $p_1$ for example, in the first half of its samples and opposite to $p_1$ in the second half of its samples.

With these two pilots, we get transitions due to the IQ imbalances which are opposite.

The imbalance residual variations can be calculated according to an interference signal of mirror carriers and subcarriers, according to a criterion for minimising the envelope of the interference signal for example.

A parameter $|E|^2$, which is characteristic of the envelope of said interference signal, can be used for this purpose.

Preferably, only the transitions of the interference signal are taken into account.

According to one embodiment:
we measure the value of the complex frequency samples of pilots received in the neighbourhood of the transitions,
we compare these samples to the samples of the transmitted pilot, and from these we extract the characteristic parameter $|E|^2$ of the envelope of the IQ imbalances interference.

Parameter $|E|^2$ can, for example, be equal or proportional to:

$$|E(n)|^2 = \left| \frac{(S_5(n)p(n+1) - S_5(n+1)p(n))p_m(n)}{(p(n+1)p_m(n) - p(n)p_m(n+1))S_5(n)^{m*}} \right|^2$$

and thus:

$$|E(n)|^2 = \left| \frac{\begin{array}{l}(S_5(n)p(n+1) - S_5(n+1)p(n))p_m(n) - \\ (S_5(n+1)p(n+2) - S_5(n+2)p(n+1))p_m(n+1)\end{array}}{\begin{array}{l}S_5(n)^{m*}(p(n+1)p_m(n) - p(n)p_m(n+1)) - \\ S_{5m}(n+1)^*(p(n+2)p_m(n+1) - p(n+1)p_m(n+2))\end{array}} \right|^2$$

where $S_5(n)$ is the received signal on subcarrier "n", $S_{5m}(n)$ is the received signal on the mirror subcarrier, $p(n)$ is the value of the pilot on subcarrier "n" and $p_m(n)$ is the pilot on the mirror subcarrier.

The βest estimate of the IQ imbalances can be corrected, in relation to the preceding estimate, proportionally to $$\frac{\partial |E|^2}{\partial \beta'},$$

where β' represents the residual IQ imbalance.

The invention also concerns a method for correction of the IQ imbalance of a receiver, in the presence of a frequency and/or clock offset, in order to obtain a corrected estimate of the IQ imbalance. According to the invention, we perform:

an IQ imbalance estimate carried out from pilots, or learning sequences, which give rise to transitions due to the IQ imbalances which are opposite, a correction of the frequency and/or clock offsets and of the IQ imbalance according to the estimate of the imbalance, in order to obtain a corrected estimate of the IQ imbalance.

The pilots employed in this method are used to obtain transitions due to the IQ imbalances which are opposite.

The IQ imbalances estimate is conducted using an algorithm which here is not necessarily adaptive, by virtue of the opposite transitions obtained, the compensation of the IQ imbalance and of any frequency offset can then be carried out directly, without the use of imbalance residual variations.

The IQ imbalance estimate can be carried out from two pilots or learning sequences.

The IQ imbalance estimate can, for example, be carried out from two pilots or learning sequences, $p_1$ and $p_2$, where $p_1$ is composed of a pseudo-random sequence and $p_2$ is identical to $p_1$ in the first half of its samples and opposite to $p_1$ in the second half of its samples.

The invention also concerns a method for the correction of a signal s2 received and digitised by a wireless receiver, including a correction of the IQ imbalance as presented above, and correction of the signal s2 according to this imbalance.

The correction of signal s2 is preferably carried out before a Fourier transform operation.

The imbalance residual variations can be obtained from the signal S4 obtained by fast Fourier transform (FFT) in the receiver.

According to the invention, compensation of the frequency and clock offsets as well as of the IQ imbalances, can be carried out, for example from continuous frequency pilots.

According to the invention, it is therefore possible to jointly adapt the estimates of the frequency and clock offsets and the IQ imbalances (imbalances between the in-phase components (or I components) and phase quadrature components (or Q components) of the receiver signal).

A first IQ imbalance estimate can be carried out after a coarse frequency synchronisation, or after a fine frequency offset correction.

This method can also include a channel estimate step and correction of this estimate according to the frequency and clock offsets and the IQ imbalances.

Correction of the frequency and clock offsets can be carried out from the signal obtained by fast Fourier transform in the receiver, or indeed from a channel estimate.

Correction of the frequency and clock offsets can be carried out from two pilots or learning sequences, $p_1$ and $p_2$, that are consecutive in time or with interleaved data symbols.

A channel estimate step can be provided, which can be corrected according to the IQ imbalance and possibly according to clock and/or frequency offsets.

The invention also concerns a correction process, in a wireless receiver, of a received signal s1, where this signal includes an error due to a frequency and/or clock offset as well as a gain and/or phase imbalance, in which:

the received signal s1 is digitised, the gain and/or phase imbalance of the digitised signal is corrected before fast Fourier transformation of the signal.

A step for correction of the error due to a frequency and/or clock offset, before digitisation of the received signal, or after digitisation and before fast Fourier transformation of the signal, can be provided.

According to a variant, a step for correction of the error due to a clock offset is carried out after fast Fourier transformation of the signal.

The invention also concerns a receiver device that includes means for correction of an IQ imbalance, including:

means for estimating the correction of the IQ imbalance, according to imbalance residual variations since a preceding estimate of the IQ imbalance, means for correction of the IQ imbalance according to this estimate, in order to obtain a corrected estimate of the IQ imbalance, means for correction of frequency and clock offsets.

The IQ imbalance estimate can be carried out from pilots or learning sequences, which give rise to transitions due to the opposite IQ imbalances.

The IQ imbalance estimate can be carried out from two pilots or learning sequences.

The IQ imbalance estimate can be carried out, for example, from two pilots or learning sequences, $p_1$ and $p_2$, $p_1$ being composed, for example, of a pseudo-random sequence, and $p_2$ being identical, for example, to $p_1$ in the first half of its samples and opposite to $p_1$ in the second half of its samples. With these two pilots, we get transitions due to the IQ imbalances which are opposite.

Such a device can also include means to calculate the imbalance residual variations according to an interference signal of carriers and mirror subcarriers, for example, according to a criterion for minimising the envelope of the interference signal.

The imbalance residual variations can be calculated according to a parameter $|E|^2$ that is characteristic of the envelope of said interference signal.

Preferably, only the transitions of the interference signal are taken into account.

A device according to the invention can also include:

means for measuring the value of the complex pilot frequency samples in the neighbourhood of the transitions, means for comparing these samples to the samples of the transmitted pilot and for calculating the characteristic parameter $|E|^2$ of the envelope of the IQ imbalances interference.

Means can also correct the βest estimate of the IQ imbalances, in relation to the preceding estimate, proportionally to $$\frac{\partial |E|^2}{\partial \beta'},$$

where β' represents the residual IQ imbalance.

The invention also concerns a receiver device that includes means for correction of an IQ imbalance, including:

means for estimating the correction of the IQ imbalance, from pilots or learning sequences which give rise to transitions due to the opposite IQ imbalances, means for correction of the IQ imbalance according to this estimate, in order to obtain a corrected estimate of the IQ imbalance, means for correction of frequency and clock offsets.

The IQ imbalance estimate can be carried out from two pilots or learning sequences.

The IQ imbalance estimate can be carried out from two pilots or learning sequences, $p_1$ and $p_2$, with $p_1$ being composed, for example, of a pseudo-random sequence and $p_2$ being identical, for example, to $p_1$ in the first half of its samples and opposite to $p_1$ in the second half of its samples.

A receiver device according to the invention can also include means for correction of a signal s2, received and digitised by a wireless receiver according to the IQ imbalance.

The correction of the signal s2 can be carried out before a Fourier transform operation.

The imbalance residual variations can be obtained from the signal obtained by fast Fourier transform (FFT) in the receiver.

In a device according to the invention, means can advantageously be used to effect a first IQ imbalances estimate either after a coarse synchronisation, or after a fine frequency correction.

Means for channel estimate and for correction of this estimate according to the frequency and clock offsets and of the IQ imbalances, can also be provided.

Means for correction of frequency and clock offsets can perform this correction from the signal obtained by fast Fourier transform (FFT) in the receiver or from a channel estimate.

Means for correction of frequency and clock offsets can effect this correction from two pilots or learning sequences, $p_1$ and $p_2$, that are consecutive in time or with interleaved data symbols.

Channel estimate means can also be provided, with channel estimate being corrected according to the IQ imbalance and/or according to clock and/or frequency offsets.

The invention also concerns a computer program that includes the instructions to implement a method according to the invention.

The invention also concerns a data medium, capable of being read by a computer system, including data in coded form, to implement a method according to the invention.

The invention also concerns a software product that includes a data medium suitable to be read by a computer system, and used to implement a method according to the invention.

DETAILED PRESENTATION OF PARTICULAR EMBODIMENTS

According to the invention, we are aiming to correct residual offsets in a signal.

A symbol and frame synchronisation may have been carried out beforehand for such a signal, as well as a coarse frequency synchronisation.

The residual frequency offset concerned is less than half of the frequency separation between subcarriers for example.

The signals concerned are complex and sampled in the time domain (these signals are indicated in what follows by variables in lower case) or the frequency domain (these signals are indicated in what follows by variables in upper case).

Figure 1A:
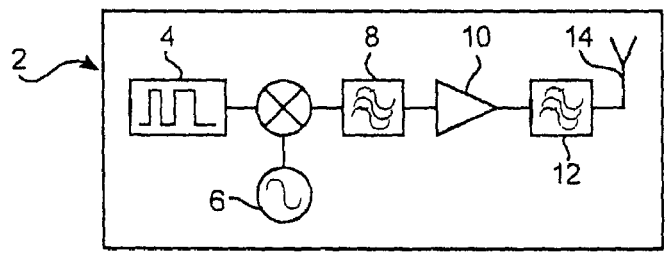
FIGS. 1A and 1B represent the diagram of a digital radio transmission according to prior art.
Figure 1B:
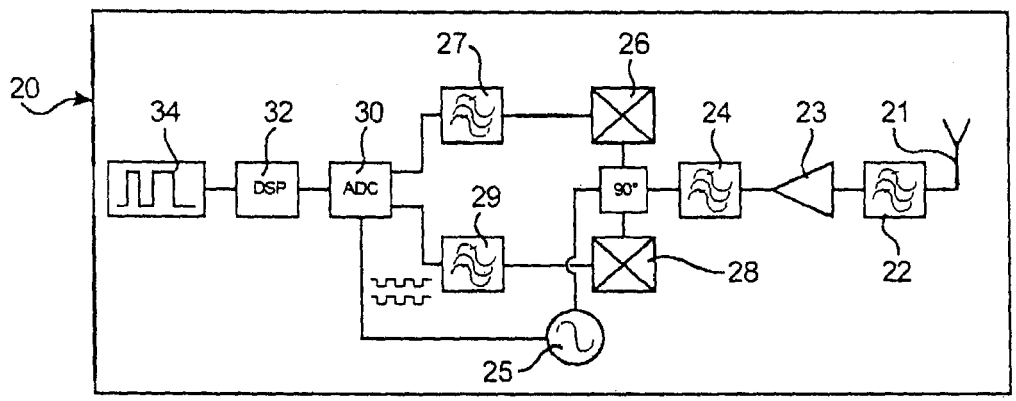
Figure 2A:
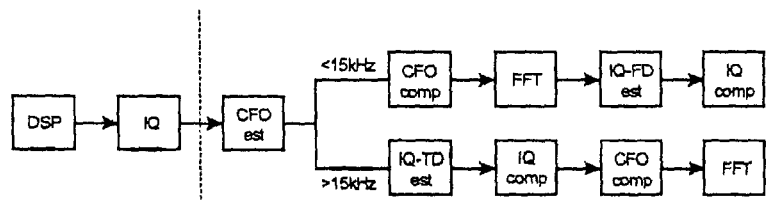
FIGS. 2A and 2B represent correction processes according to the prior art.
Figure 2B:
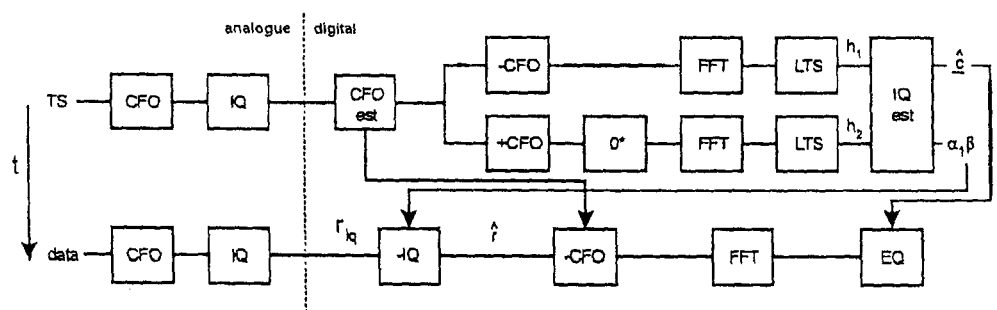
Figure 3:
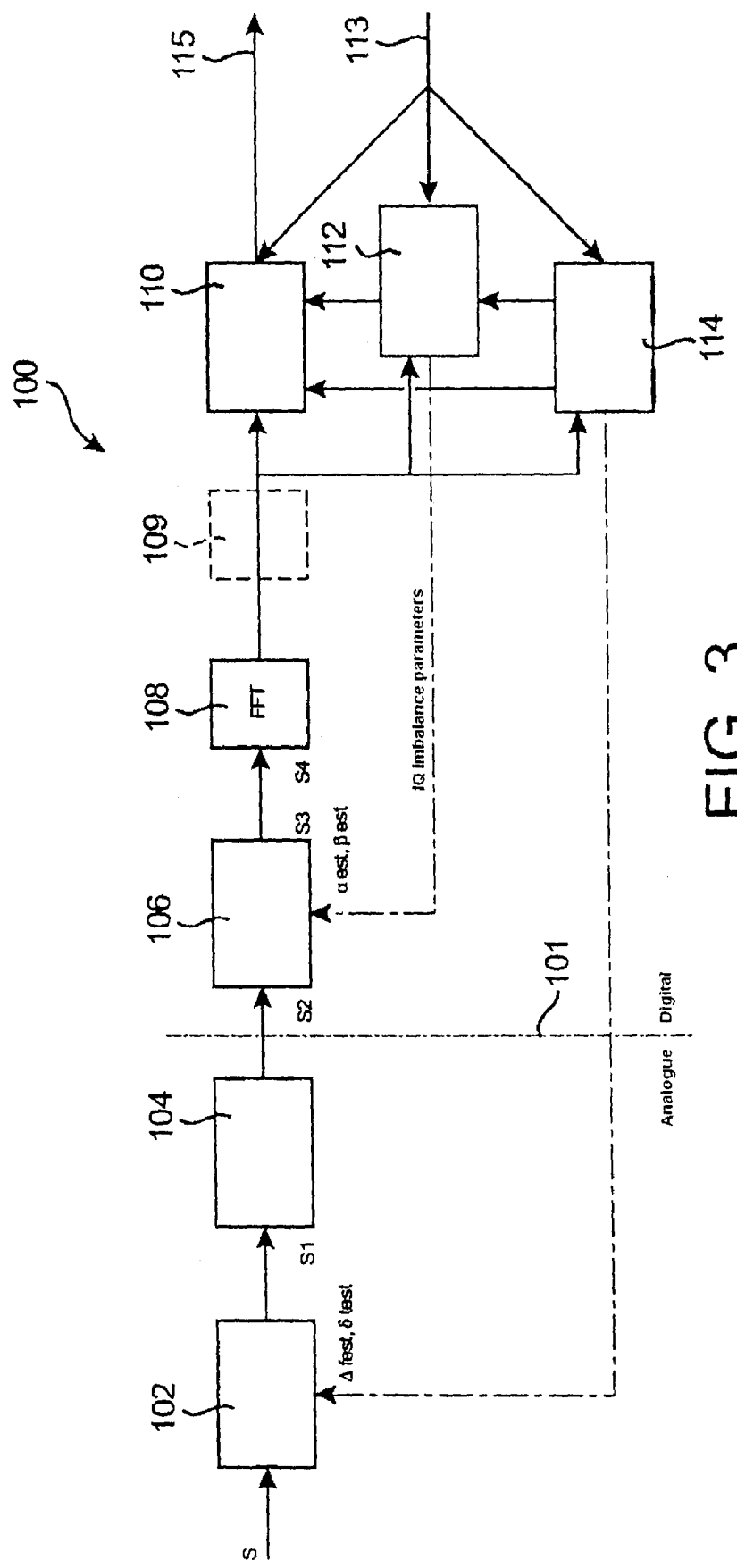
FIG. 3 represents a first embodiment of a method and of a device according to the invention.
Figure 4:
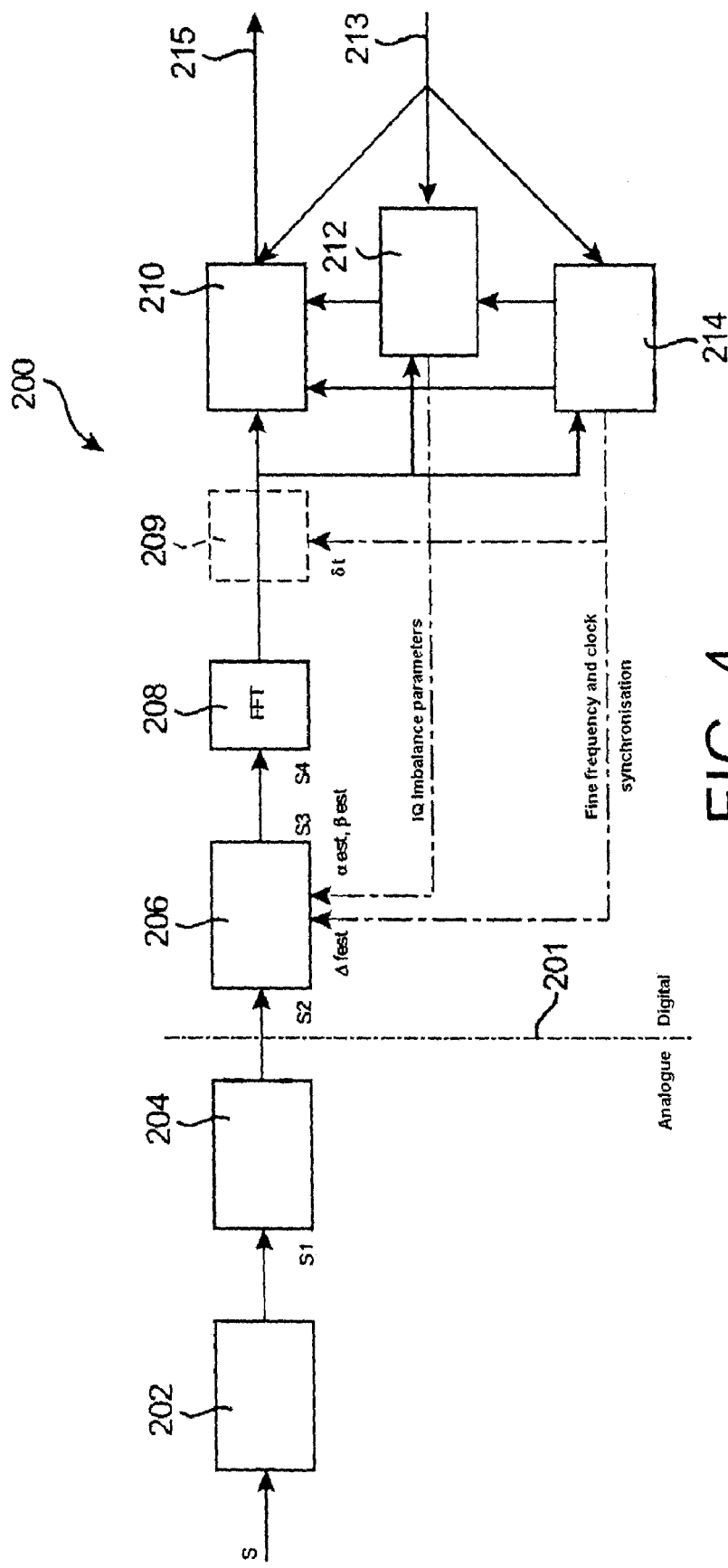
FIG. 4 represents a second embodiment of a method and of a device according to the invention.

These signals appear at the input and output of the different blocks of the reception chains described in FIGS. 3 and 4, each of which concerns one embodiment of the invention.

Each of the blocks described in FIGS. 3 and 4 will be described below.

In these two figures, the two analogue and digital domains are separated symbolically by a broken line 101, 201.

An input signal s is assigned, both in frequency and in IQ imbalance, and this is represented symbolically in FIGS. 3 and 4 by means 102, 104, 202, and 204.

The incoming signal to the digital part, after digitisation (by means not shown in the figures) is applied to means 106 in order to compensate for the IQ imbalance (FIG. 3) or means 206 for compensation both of the IQ imbalances and of the frequency offsets (FIG. 4).

In FIG. 3, the frequency offsets are compensated upstream, in the analogue part, while the two corrections take place in the digital part in FIG. 4.

In both cases, the signal s3 produced by means 106 and 206 is subjected to processing by fast Fourier transform (FFT) by means 108 and 208.

The signal S4 thus produced can be sent to means 110 and 210 for channel estimate.

From signal S4, means 112, 212 are used to effect an IQ imbalances estimate, with this estimate enabling means 106, 206 to correct the signal s2 after digitisation, but before FFT processing.

From signal S4, means 114, 214 are used to carry out an estimate of the frequency and clock offsets, and this estimate enables means 206 (FIG. 4) to correct the signal s2 after digitisation, but before FFT processing, or means 102 (FIG. 3) to correct the incoming signal, before digitisation.

This estimate also allows the IQ imbalance estimate to be refined by means 112, 212, as well as, possibly, channel estimate.

In the embodiment of FIG. 4, a clock offset can also be corrected after FFT by means 209 in order to compensate for clock offsets. In fact the clock offsets are not easy to compensate before FFT. In addition, such means 109 to compensate for clock offsets can also be provided in the diagram of FIG. 3, at the FFT output, as shown in this figure by broken lines.

Pilot signals 113 and 213 are sent regularly, and these signals enable means 112, 212, 114, and 214 to calculate the estimates of the IQ imbalances and the frequency and clock offset estimates. These pilot signals are at known frequencies.

The estimate means 112, 114, 212, 214 effect the correction estimates from the digital signals output from the FFT, or possibly from the signals coming from means 209 or 109, but also from pilot sequences 113, 213.

The correction signals produced by these estimate means are used where appropriate to correct channel estimate of means 110, 210 for channel estimate.

However the signal produced by these means 110, 210 is in fact not very damaged in relation to the incoming signal in these means, which is already a corrected signal.

An output signal 115, 215, and possibly a channel estimate signal, are produced by the system.

As can be seen in FIGS. 3 and 4, means 110, 210 for channel estimate play no part in the error estimate calculations.

A frequency offset $\Delta f$ between the transmitter and receiver creates a phase shift which is expressed according to sampling period $T_e$:

$$s_1(k)=s(k).e^{j*2\pi*\Delta f*k*T_e}$$

For its part, the IQ disparity is characterised by the two imbalance parameters, namely gain $\epsilon$ and phase $\Delta\Phi$:

$$Re\{s_2\}=(1+\epsilon)\cos\Delta\Phi Re\{s_1\}-(1+\epsilon)\sin\Delta\Phi Im\{s_1\}$$

$$Im\{s_2\}=(1-\epsilon)\cos\Delta\Phi Im\{s_1\}-(1-\epsilon)\sin\Delta\Phi Re\{s_1\}$$

Then $$s_2=\alpha.s_1+\beta.s_1^*$$

Where:

$$\alpha=\cos\Delta\Phi-j\epsilon\sin\Delta\Phi$$

$$\beta=\epsilon\cos\Delta\Phi-j\sin\Delta\Phi$$

s2 is the incoming signal in the digital part of the device (see FIGS. 3 and 4).

It can be characterised in an equivalent manner in OFDM by the interferences of the mirror subcarrier. After the Fourier Transform step:

$$S_2=\alpha.S_1+\beta.S_1^{m*}.$$

In general, $S^m$ refers to the mirror signal of any signal S. $S^m$ is the signal in which one has switched subcarriers "n" and subcarriers "N-n", where N is the number of subcarriers. S* is the conjugate signal of S.

As illustrated in FIGS. 3 and 4, IQ imbalances compensation can be carried out immediately after analogue-digital conversion by means of the estimates of the IQ parameters coming from means 112, 212 for estimating the IQ disparity:

$$s_3(k) = \frac{\alpha_{est}^* s_2(k) - \beta_{est} s_2^*(k)}{|\alpha_{est}|^2 - |\beta_{est}|^2}$$

where $s_2$ is the damaged signal and $s_3$ is the corrected signal according to estimates $\alpha_{est}$ and $\beta_{est}$ of parameters $\alpha$ and $\beta$ of the IQ imbalances.

The corrected signal of the IQ imbalances is then given by:

$$s_3(k) = \frac{(\alpha_{est}^*\alpha - \beta_{est}\beta^*) \cdot s_1(k) - (\beta_{est}\alpha^* - \alpha_{est}^*\beta) \cdot s_1(k)^*}{|\alpha_{est}|^2 - |\beta_{est}|^2}$$

If we call $\alpha'$ and $\beta'$ the residual offsets, which indicate the separation between the actual values of $\alpha$ and $\beta$ and their estimated value, then:

$$\alpha' = \frac{\alpha_{est}^*\alpha - \beta_{est}\beta^*}{|\alpha_{est}|^2 - |\beta_{est}|^2}$$

$$\beta' = \frac{\beta_{est}\alpha^* - \alpha_{est}^*\beta'}{|\alpha_{est}|^2 - |\beta_{est}|^2}$$

and we have:

$$s_3(k)=\alpha's_1(k)+\beta's_1(k)^*$$

The adaptation algorithms are used to minimise $\beta'$ and to make $\alpha'$ unitary.

Since these two parameters are related (since $\alpha$ and $\beta$ are themselves related), it is possible to act upon either, or on a combination of the two, in order to compensate for the IQ imbalances.

To simplify the calculations, it is preferable to seek to minimise $\beta$.

As already indicated above, the compensation of frequency and clock offsets is carried out either by sending a control signal to the frequency synthesis means 102 (as illustrated in FIG. 3), or by correcting the frequency offset before the Fast Fourier transform step, and the clock offset after the Fast Fourier transform step (as illustrated in FIG. 4), or in a looped system of the digital PLL type.

It is also possible to coarsely compensate these frequency and clock offsets in the analogue stages, and to correct the residual offsets in the digital stages. Digital correction of the frequency offset consists of a phase rotation:

$$s_4(k)=s_3(k).e^{-j*2\pi*\Delta f_{est}*k*T_e}$$

where $s_3$ is the damaged signal and $s_4$ is the corrected signal according to the estimated $\Delta f_{est}$ of the frequency offset and Te is the sampling period. In the architecture of FIG. 3, correction of the frequency offset is analogue ($s_4=s_3$).

The digital correction of the clock offset consists of a phase rotation after FFT:

$$S_5(p) = S_4(p) \cdot e^{-j*2\pi*p*\frac{\delta t_{est}}{T_e}}$$

where $S_4$ is the damaged signal and $S_5$ is the corrected signal according to the estimated $\delta t_{est}$ of the clock offset.

Steps for calculation and updating of the estimates of IQ imbalances will now be presented.

The estimate parameters of the IQ imbalances are determined by estimating a residual variation of the imbalance in relation to a preceding estimate or the preceding estimate.

This estimate can be carried out by virtue of the continuous frequency pilots P(n) a sequence in which all the frequency samples are known), by minimising the envelope of the parasitic signal.

After the Fourier Transform step, the IQ imbalances correspond in fact to an interference signal of the mirror subcarriers, as explained below with reference to FIGS. 5A-5C.

Figure 5A:
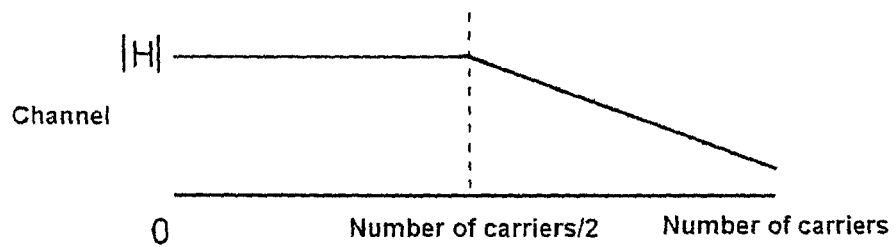
FIGS. 5A to 5C illustrate the effect of the interference of mirror subcarriers due to the IQ imbalances.

By way of an example, FIG. 5A represents the modulus of the propagation channel, which is constant for the pilots of the subcarriers and decreasing for the pilots of the mirror subcarriers.

Figure 5B:
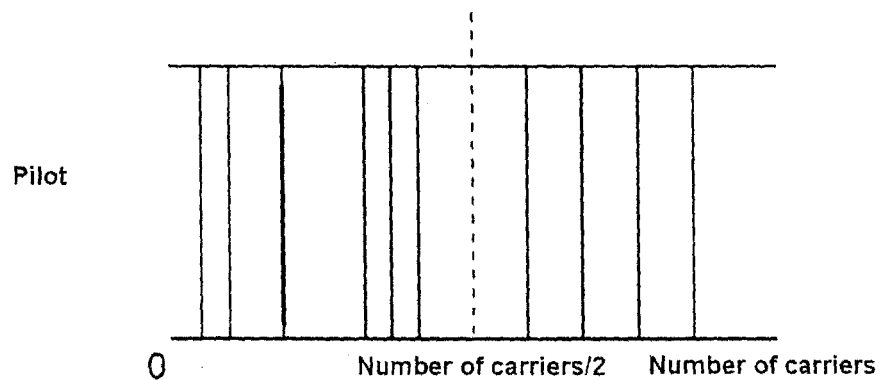

FIG. 5B represents pilots p(n) (pilot at subcarrier n) and the mirror pilots. pm(n) is the mirror pilot at subcarrier N-n.

Figure 5C:
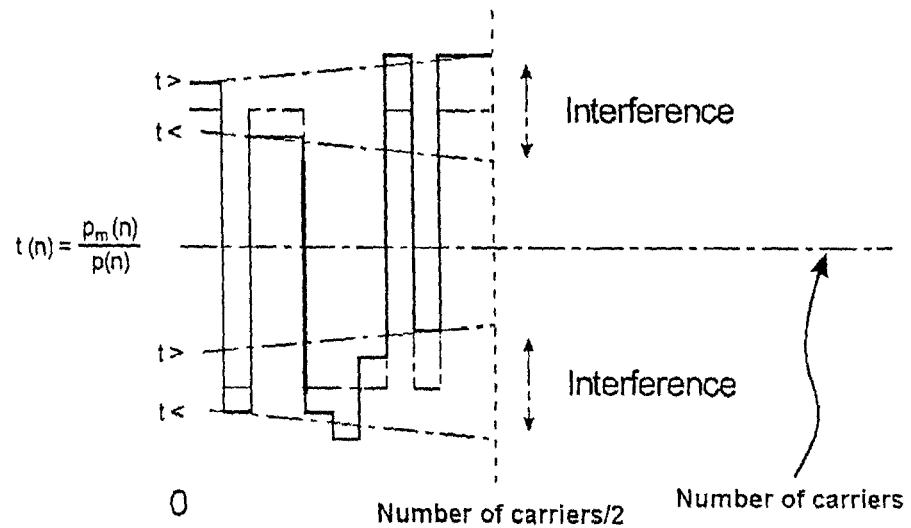

FIG. 5C represents the interference resulting from the interference of the pilots and the mirror pilots. It is to this interference that the IQ imbalances correspond. The solid-line curve of FIG. 5C in fact represents signal S5, at the output of the module to compensate for the clock offset.

Whenever the ratio between pilot on subcarrier "n" and the mirror pilot on subcarrier "N-n" changes, interference signal S5 changes its sign.

By observing these "transitions", it is possible to extract, in the frequency domain, an estimate of the IQ imbalances.

These are p(n), the value of the pilot on subcarrier "n", and pm(n), the pilot on the mirror subcarrier "N-n", where N is the number of subcarriers.

A transition is presents when:

$$\frac{p_m(n+1)}{p(n+1)} \neq \frac{p_m(n)}{p(n)}$$

In order to estimate the characteristic parameter β of the IQ imbalances:
- we measure the value of the complex pilot frequency samples in the neighbourhood of the transitions,
- we compare these samples to the samples of the transmitted pilot and from these we extract a characteristic parameter of the envelope of the IQ imbalances interferences,
- we weight this parameter possibly, in the adaptation algorithm.

The adaptation algorithm can minimise the envelope of the IQ imbalance interference by using the following quadratic criterion:

$$|E(n)|^2 = \left|\frac{(S_5(n)p(n+1) - S_5(n+1)p(n))p_m(n)}{(p(n+1)p_m(n) - p(n)p_m(n+1))S_5(n)^{m*}}\right|^2$$

It is possible to reduce the effect of channel variation by using the following criterion:

$$|E(n)|^2 = \left|\frac{\begin{array}{c}(S_5(n)p(n+1) - S_5(n+1)p(n))p_m(n) - \\ (S_5(n+1)p(n+2) - S_5(n+2)p(n+1))p_m(n+1)\end{array}}{\begin{array}{c}S_5(n)^{m*}(p(n+1)p_m(n) - p(n)p_m(n+1)) - \\ S_{5m}(n)^*(p(n+2)p_m(n+1) - p(n+1)p_m(n+2))\end{array}}\right|^2$$

where $S_5(n)$ is the received signal on subcarrier "n", $S_{5m}(n)$ is the received signal on the mirror subcarrier, p(n) is the value of the pilot on subcarrier "n" and $p_m(n)$ is the pilot on the mirror subcarrier.

In relation to the known criteria of document WO03/101064, the value of the criteria according to the invention, or of the criterion concerning error minimisation between consecutive subcarriers, will now be demonstrated.

As can be seen from this document, the estimate parameters of the IQ imbalances can be carried out from channel estimate by minimising the quadratic error between consecutive subcarriers. The estimate by the method of least squares gives the following:

$$\beta'_{est} = A/B, \text{ avec:}$$

$$A = \left(\begin{array}{c}\hat{H}_{p+1} \dfrac{2K\sin\left(\dfrac{\pi\left(\Delta fT + (p+1)\dfrac{\delta t}{T}\right)}{2K}\right)}{\sin\left(\pi\left(\Delta fT + (p+1)\dfrac{\delta t}{T}\right)\right)} e^{-j*2\pi*\frac{2K-1}{2K}\left(\Delta fT + (p+1)\frac{\delta t}{T}\right)} - \\ \hat{H}_p \dfrac{2K\sin\left(\dfrac{\pi\left(\Delta fT + p\dfrac{\delta t}{T}\right)}{2K}\right)}{\sin\left(\pi\Delta fT + p\dfrac{\delta t}{T}\right)} e^{-j*2\pi*\frac{2K-1}{2K}\left(\Delta fT + p\frac{\delta t}{T}\right)}\end{array}\right)$$

$$B = \left(\begin{array}{c}t_{p+1}\hat{H}_{p+1}^{*m} \dfrac{2K\sin\left(\dfrac{\pi\left(\Delta fT + (p+1)\dfrac{\delta t}{T}\right)}{2K}\right)}{\sin\left(\pi \cdot \left(\Delta fT + (p+1)\dfrac{\delta t}{T}\right)\right)} e^{j*2\pi*\frac{2K-1}{2K}\left(\Delta fT + (p+1)\frac{\delta t}{T}t\right)} - \\ t_p\hat{H}_p^{*m} \dfrac{2K\sin\left(\dfrac{\pi\left(\Delta fT + p\dfrac{\delta t}{T}\right)}{2K}\right)}{\sin\left(\pi\left(\Delta fT + p\dfrac{\delta t}{T}\right)\right)} e^{j*2\pi*\frac{2K-1}{2K}\left(\Delta fT + p\frac{\delta t}{T}t\right)}\end{array}\right)$$

where $\hat{H}$ is the measurement or the estimate of the channel without inter-carrier interference (see its detailed expression later), δt is the clock offset, and T is the sampling period.

We can make the following simplifying assumptions:

$$\frac{2K\sin\left(\frac{\pi\left(\Delta fT + (p+1)\frac{\delta t}{T}\right)}{2K}\right)}{\sin\left(\pi\left(\Delta fT + (p+1)\frac{\delta t}{T}\right)\right)} \approx \frac{2K\sin\left(\frac{\pi\left(\Delta fT + p\frac{\delta t}{T}\right)}{2K}\right)}{\sin\left(\pi\left(\Delta fT + p\frac{\delta t}{T}\right)\right)}$$

So that:

$$\beta'_{est} = \frac{\left(\hat{H}_{p+1}e^{-j*2\pi*\frac{2K-1}{2K}\left(\Delta fT+(p+1)\frac{\delta t}{T}\right)} - \hat{H}_p e^{-j*2\pi*\frac{2K-1}{2K}(\Delta f(1+\delta t)+p\delta t)}\right)}{\left(t_{p+1}\hat{H}_{p+1}^{*m}e^{j*2\pi*\frac{2K-1}{2K}\left(\Delta fT+(p+1)\frac{\delta t}{T}\right)} - t_p\hat{H}_p^{*m}e^{j*2\pi*\frac{2K-1}{2K}(\Delta f+p\delta t)}\right)^*}$$

$$= \frac{\left(\hat{H}_{p+1}e^{-j*2\pi*\frac{2K-1}{2K}\frac{\delta t}{T}} - \hat{H}_p\right)}{\left(t_{p+1}\hat{H}_{p+1}^{*m}e^{j*2\pi*\frac{2K-1}{2K}\frac{\delta t}{T}} - t_p\hat{H}_p^{*m}\right)^*}$$

The IQ imbalances estimate is therefore sensitive to the clock and frequency offsets which rotate the phase from one subcarrier to the next. There can be a strong influence by these offsets on the IQ imbalance estimate, up to 100% of the estimate. In practice one can take the quadratic mean of the above expression in order to be more robust in relation to the noise present in the channel and the receiver:

$$\beta'_{est} = \frac{\sum_{p=-K}^{K}\left(\hat{H}_{p+1}e^{-j*2\pi*\frac{2K-1}{2K}\frac{\delta t}{T}} - \hat{H}_p\right)\left(t_{p+1}\hat{H}_{p+1}^{*m}e^{j*2\pi*\frac{2K-1}{2K}\frac{\delta t}{T}} - t_p\hat{H}_p^{*m}\right)^*}{\sum_{p=-K}^{K}\left|t_{p+1}\hat{H}_{p+1}^{*m}e^{j*2\pi*\frac{2K-1}{2K}\frac{\delta t}{T}} - t_p\hat{H}_p^{*m}\right|^2}$$

If the channel was previously corrected in respect of the frequency and clock offsets, then the estimates can be written more simply:

$$\beta'_{est} = \frac{\sum_{p=-K}^{K}(\hat{H}_{p+1} - \hat{H}_p)(t_{p+1}\hat{H}_{p+1}^{*m} - t_p\hat{H}_p^{*m})^*}{\sum_{p=-K}^{K}|t_{p+1}\hat{H}_{p+1}^{*m} - t_p\hat{H}_p^{*m}|^2}$$

According to the invention, the estimate is adapted iteratively by the use of β', which tends toward 0 when the estimate approaches the values of the real imbalances. Adaptation can be carried out by a method of the gradient type (Least Mean Square or Recursive Least Square).

$$\beta_{est}(n+1) = \beta_{est}(n) + \mu.\beta'.\alpha^* \approx \beta_{est}(n) + \mu.\beta'.\alpha_{est}(n)^*$$

where $\mu$ is a convergence factor.

And then:

$$\alpha_{est}(n+1) = \sqrt{1 - \text{Im}\{\beta_{est}(n+1)\}^2} - j\frac{\text{Re}\{\beta_{est}(n+1)\}\text{Im}\{\beta_{est}(n+1)\}}{\sqrt{1 - \text{Im}\{\beta_{est}(n+1)\}^2}}$$

The criterion for minimisation of the interference envelope will be detailed below.

Let $p(n)$ be the value of the pilot sequence at the nth subcarrier, $p_m(n)$ the mirror value, $s(n)$ the signal corresponding to this pilot after FFT, and $s_m(n)$ the mirror value.

For two consecutive samples of the same value, and of different mirror values, the separation between these samples corresponds to the width of the envelope of the IQ imbalances and to channel variation.

Let:

$$E(n) = \frac{s(n)p(n+1) - s(n+1)p(n)}{s_m(n)^*} \frac{p_m(n)}{p(n+1)p_m(n) - p(n)p_m(n+1)} \quad (1)$$

E corresponds to the half envelope of the parasitic signal due to the IQ imbalances and to channel variation, the whole being "normalised" by the mirror channel. E corresponds in fact to parameter $\beta'$.

In fact, if $e(n)$ is the signal that would be received on subcarrier "n" if there was no IQ imbalance, $$s(n) = \alpha' e(n) + \beta' e_m(n)^*$$

One can then develop the above criterion (1) as follows:

$$E(n) = \frac{\alpha'[p(n+1)e(n) - p(n)e(n+1)] + \beta'[p(n+1)e_m(n)^* - p(n)e_m(n+1)^*]}{(p(n+1)p_m(n) - p(n)p_m(n+1))[\alpha' e_m(n)^* - \beta' e(n)]} p_m(n)$$

The first term $[p(n+1)e(n) - p(n)e(n+1)]$ corresponds to the channel variation from one subcarrier to another.

Two successive pilot samples are, if one neglects the sign, close to one carrier or the other. Therefore:

$$e_m(n+1)^* \approx \frac{p_m(n+1)}{p_m(n)} e_m(n)^*.$$

If the channel does not vary much, and with the above approximation, we can deduce that:

$$E(n) \approx \frac{\beta'\left[p(n+1)e_m(n)^* - \frac{p(n)p_m(n+1)}{p_m(n)}e_m(n)^*\right]}{(p(n+1)p_m(n) - p(n)p_m(n+1))s_m(n)^*} p_m(n) = \beta'\frac{e_m(n)^*}{s_m(n)^*} \approx \beta'$$

If the channel varies in a quasi-linear manner between three successive samples (a reasonable assumption), the second expression:

$$E(n) = \frac{((s(n)p(n+1) - s(n+1)p(n))p_m(n) - (s(n+1)p(n+2) - s(n+2)p(n+1))p_m(n+1))}{(s_m(n)^*(p(n+1)p_m(n) - p(n)p_m(n+1)) - s_m(n+1)^*(p(n+2)p_m(n+1) - p(n+1)p_m(n+2))}$$

gives a channel variation term $[(p(n+1)e(n) - p(n)e(n+1)) - (p(n+2)e(n+1) - p(n+1)e(n+2))]$ that is smaller than $[p(n+1)e(n) - p(n)e(n+1)]$ and negligible in estimate $\beta'$.

In order to attenuate the bias due to channel variation, then from the above expression $E(n)$, one can therefore subtract two consecutive variations.

The adaptation of the estimates (in FIGS. 3 and 4: in estimate block 112, 212 of the imbalances), can be carried out by a method of the gradient type (Least Mean Square or Recursive Least Square) which iteratively minimises the $|E|^2$ criterion on all of the subcarriers. The algorithm is therefore given by:

$$\beta_{est} = \beta_{est} + \mu\frac{\partial |E|^2}{\partial \beta'},$$

where $\mu$ is the convergence factor, a formula which indicates the adaptive character of the algorithm. In other words, a previous value of $\beta$est is corrected of the residual variations of the IQ imbalance, these residual variations being indicated by the term $$\frac{\partial |E|^2}{\partial \beta'}.$$

$\alpha$est and $\beta$est are also linked by:

$$\alpha_{est} = \sqrt{1 - \text{Im}\{\beta_{est}\}^2} - j\frac{\text{Re}\{\beta_{est}\}\text{Im}\{\beta_{est}\}}{\sqrt{1 - \text{Im}\{\beta_{est}\}^2}}$$

The choice of $\mu$ will depend on what is wanted in terms of precision and speed of convergence. If the $\mu$ factor is chosen to be low, then precision is good, but the speed of convergence is low, and vice versa if $\mu$ is larger.

The iterative estimate of $\beta$est can be carried out as soon as pilots are available.

The above developments show that the $|E|^2$ estimator is linked directly to the $\beta'$ error on the imbalance parameter $\beta$ (non-biased estimator).

The interference envelope can also be weighted by channel variation by use of the simplified criterion:

$$|E(n)|^2 = \left|\frac{(S_5(n)p(n+1) - S_5(n+1)p(n))}{(p(n+1)p_m(n) - p(n)p_m(n+1))}\right|^2$$

Also, due to the transition selection points, there is a reduction in the sensitivity of these expressions to the effects of the frequency, and the estimates are all the better for this.

In fact, only one parameter ($\beta$) suffices in order to have the information on the gain and phase.

By eliminating the weak subcarriers from the estimate (and therefore of low signal-to-noise ratio), we get a criterion that is not very sensitive to interference and to noise. This elimination can be achieved by direct measurement of the received subcarrier. And by considering only the "transitions" of the interference signal, we render the algorithm less complex in terms of calculation time.

Another criterion that can be used is minimisation of the error between consecutive subcarriers in channel estimate, developed in document WO 03/101064 (IQ-FD), modified in order to be implanted in an adaptive structure, as explained above in the demonstration. It is more sensitive however to the inter-carrier interference generated by the frequency and clock offsets than the previous criterion.

The estimate of frequency and clock offsets can also be carried out from channel estimate.

The measurement or the estimate of the channel without inter-carrier interference is given by:

$$\hat{H}_p = \left( \begin{array}{c} \alpha.H_p e^{j*2\pi*\frac{2K-1}{2K}\left(\Delta fT + p\frac{\delta t}{T}\right)} + \\ \beta.\frac{X_p^{*m}}{X_p} H_p^{*m} e^{-j*2\pi*\frac{2K-1}{2K}\left(\Delta fT + p\frac{\delta t}{T}\right)} \end{array} \right) \frac{\sin\left(\pi\left(\Delta fT + p\frac{\delta t}{T}t\right)\right)}{2K\sin\left(\frac{\pi\left(\Delta fT + p\frac{\delta t}{T}\right)}{2K}\right)}$$

The difference between two measurements on two pilots that are consecutive in time comes from the frequency and clock offsets. If we effect their correlation, we get:

$$\hat{H}_{1,p}\hat{H}_{2,p}^* = \left( \begin{array}{c} |\alpha|^2|H_p|^2 e^{-j*2\pi*\frac{2K-1}{2K}\left(\Delta fT+2K\frac{\delta t}{T}\right)} + \\ |\beta|^2.\left|\frac{X_p^{*m}}{X_p}\right|^2 |H_p^{*m}|e^{j*2\pi*\frac{2K-1}{2K}\left(\Delta fT+2K\frac{\delta t}{T}\right)} + \\ 2\text{Re}\left\{\alpha.\beta.H_p H_p^{*m}\frac{X_p^{*m}}{X_p}\right\}\cos\left(2\pi\frac{2K-1}{2K}\left(\Delta fT + 2K\frac{\delta t}{T}\right)\right) \end{array} \right) \times$$

$$\frac{\sin\left(\pi\left(\Delta fT + p\frac{\delta t}{T}\right)\right)}{2K\sin\left(\frac{\pi\left(\Delta fT + p\frac{\delta t}{T}\right)}{2K}\right)} \cdot \frac{\sin\left(\pi\left(2\Delta fT + (p+2K)\frac{\delta t}{T}\right)\right)}{2K\sin\left(\frac{\pi\left(2\Delta fT + (p+2K)\frac{\delta t}{T}\right)}{2K}\right)}$$

In practice, if pilots and mirror pilots are decorrelated, taking the mean of the subcarriers from this expression allows us to render negligible the inter-carrier interferences and the effects of the IQ imbalances in the estimate of offsets:

$$\frac{1}{2\pi}\text{angle}(E[\hat{H}_{1,p}\hat{H}_{2,p}^*]) = \Delta fT + 2K\frac{\delta t}{T}$$

Likewise, for a channel estimate between two consecutive subcarriers, we have:

$$\frac{1}{2\pi}\text{angle}(E[\hat{H}_p\hat{H}_{p+1}^*]) = \frac{\delta t}{T}$$

Once the clock offset has been estimated, the frequency offset can then be deduced.

The above calculations of the clock and frequency offsets can be carried out either on the signals at the FFT output or on the channel estimate.

This estimate of frequency and clock offsets can also be carried out from two pilots or learning sequences, $p_1$ and $p_2$, that are consecutive in time or spaced with data symbols. In this case, H is replaced in the above formulae, by the received signal/known signal ratio. We get then:

$$\frac{\delta t}{T_e} = \frac{1}{2\pi}\text{angle}(E[S_5(p)S_5^*(p+1)])$$

$$N\Delta fT_e = \frac{1}{2\pi}\text{angle}(E[S_{5,1}(p)p_1(p)^*p_2(p)S_{5,2}^*(p)]) - N\frac{\delta t}{T_e}$$

If the $p_1$ and $p_2$ sequences are identical, then:

$$N\Delta fT_e = \frac{1}{2\pi}\text{angle}(E[S_{5,1}(p)S_{5,2}^*(p)]) - N\frac{\delta t}{T_e}$$

Continuation of frequency offset estimate can be carried out in this way between two pilots spaced by "Ns" data symbols. For this, it suffices that the normalised frequency offset is less than 0.5/Ns.

With the aid of the various estimates carried out, channel estimate can also be corrected:
regarding the frequency and clock offsets:

$$\tilde{H}_p = \hat{H}_p e^{-j*2\pi*\frac{N-1}{N}\left(\Delta fNT_e+p\frac{\delta t}{T_e}\right)} \frac{N\sin\left(\frac{\pi.\left(\Delta fNT_e + p\frac{\delta t}{T_e}\right)}{N}\right)}{\sin\left(\pi.\left(\Delta fNT_e + p\frac{\delta t}{T_e}\right)\right)}$$

$$\tilde{H}_p = \hat{H}_p e^{-j*2\pi*\frac{N-1}{N}\left(\Delta fNT_e+p\frac{\delta t}{T_e}\right)},$$

for a sufficiently large N,
regarding the IQ imbalances:

$$\tilde{\tilde{H}}_p = \frac{\alpha.^*\tilde{H}_p - \beta.t_p\tilde{H}_p^{*m}}{|\alpha|^2 + |\beta|^2} \text{ where } m = \frac{p_m(n)}{p(n)}$$

regarding the noise, by calculating the mean over some (2M) consecutive subcarriers:

$$\tilde{\tilde{\tilde{H}}}_p = \frac{1}{2M}\sum_{k=p-M}^{p+M}\frac{\alpha.^*\tilde{H}_k - \beta.t_p\tilde{H}_k^{*m}}{|\alpha|^2 + |\beta|^2}$$

Due to the adaptive character of the architecture of the invention, it rapidly becomes unnecessary to correct channel estimate.

In practice, it suffices to effect these channel estimate corrections only on the very first channel estimates.

One example of the execution of an adaptation method according to the invention includes the following steps:
correction or compensation of the frequency offset between transmitter and receiver, from an estimate of this offset obtained previously, compensation, in the incident signal, of the IQ imbalances, from an estimate of these imbalances obtained previously, estimate, in the frequency domain, of the residual IQ imbalances from a known signal, estimate, in the frequency domain, of the residual frequency and clock offset between transmitter and receiver, updating of the characteristic magnitudes of the IQ imbalances and of the frequency and clock offset in the correction or compensation systems.

Figure 6A:
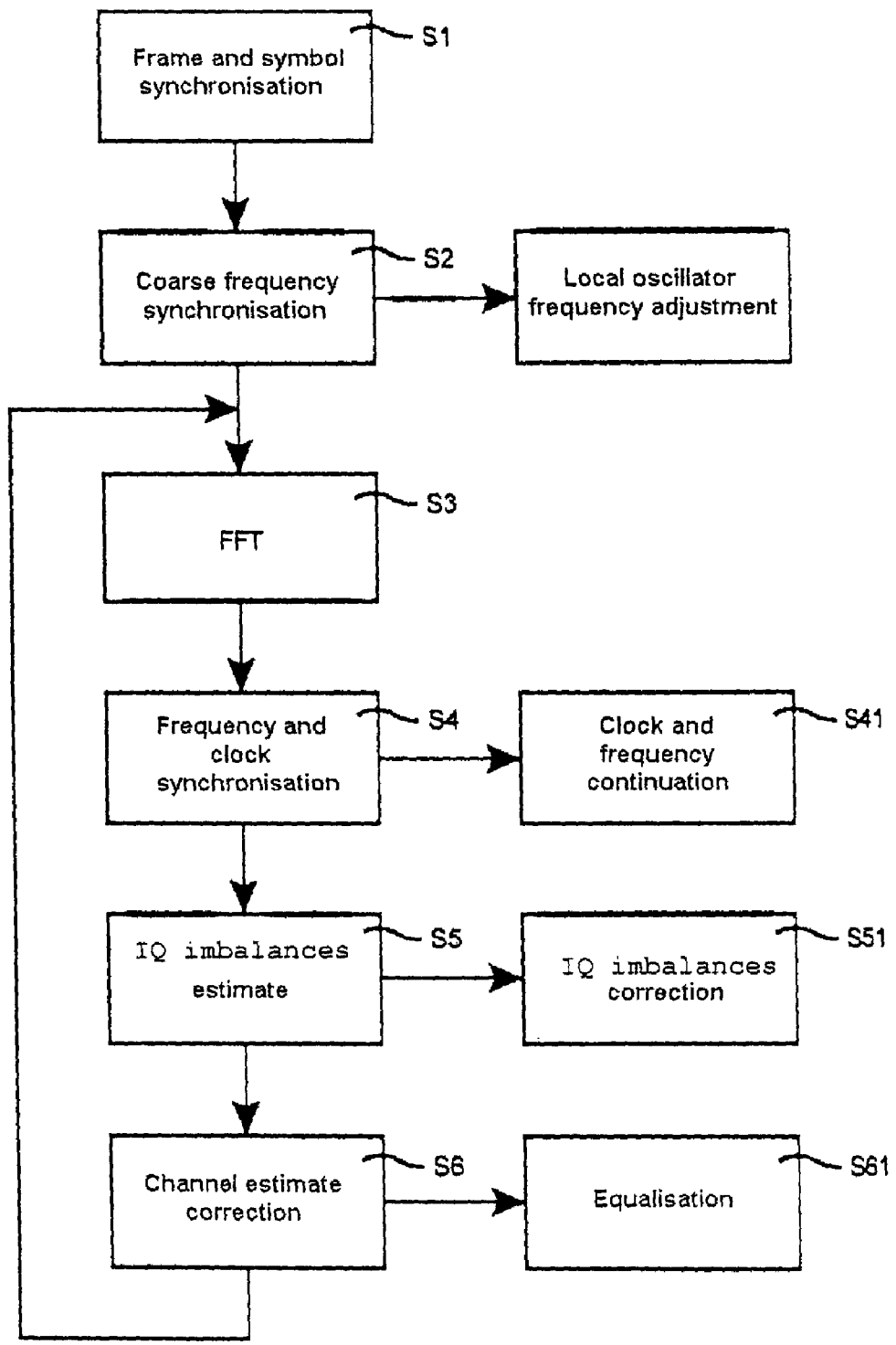
FIGS. 6A and 6B represent a sequence of steps of processes according to the invention.

The chaining of these operations of synchronisation and compensations of the imperfections can be carried out according to the diagram of FIG. 6A, which is given by way of an example.

step S1: frame and symbol synchronisation, step S2: coarse synchronisation of the frequency, and adjustment of the local oscillator frequency, step S3: the fast Fourier transform step, step S4: synchronisation of the clock frequency, and then (S41) continuation of frequency and clock (residues cancellation).

step S5: IQ imbalances estimate, and then (S51) IQ imbalances correction, step S6: channel estimate correction, and then (S61) equalisation.

Some operations in this diagram can be permutated.

One can also extend the joint compensation algorithm for the frequency and clock offsets and the IQ imbalances to the systems that do not effect channel estimate.

It is possible to effect the first IQ imbalances estimate after coarse frequency synchronisation, but it is preferable to do so after a first fine frequency offset correction, which results in a better signal to interference and noise ratio.

Estimate adaptation can be carried out at receiver switch-on.

A periodic update allows monitoring of the component variations, since these variations are slow in relation to the arrival of the pilots.

The adaptive architecture of the invention effectively and rapidly compensates the frequency and clock offsets and the IQ imbalances jointly, and allows channel estimate to be corrected automatically.

Moreover, no transfers to memory are necessary and there is no latency period. Updating of the estimates also require only one pilot sequence.

The simulations show that the IQ imbalances compensation algorithm functions for large uncorrected frequency offsets.

Use of the criterion for minimising the envelope of the interference signal, in particular renders the adaptation algorithm robust and rapid, even in the presence of a coarse frequency offset. The fact of considering only the "transitions" of the interference signal also renders the algorithm less complex and less sensitive to inter-carrier interference.

The algorithms described in this present invention have been implanted in a MC-CDMA communication chain in SystemC.

Figure 7A:
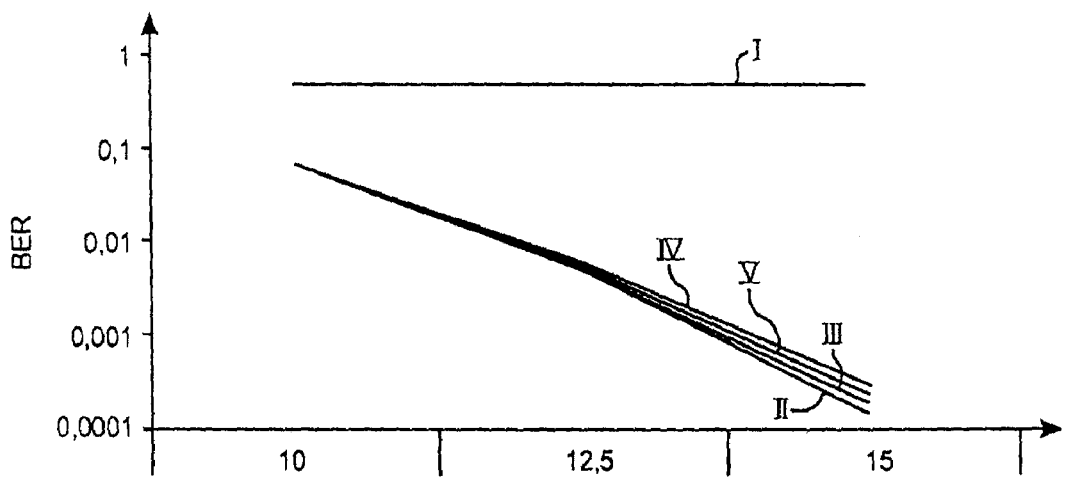
FIGS. 7A-7C are results of comparative simulations, between processes implementing an algorithm of the invention and according to the prior art.

Frequency offset and IQ imbalances models greatly damage the performances of the system. The adaptive architectures of FIGS. 3 and 4 are successful in compensating these distorting elements. It is this that is illustrated in FIG. 7A, which indicates the binary error rate (BER) according to the signal-to-noise ratio (SNR, in dB) where the channel used is the "bran E" channel.

The I curve corresponds to the binary error rate without any compensation.

Curves II, III, IV and V correspond respectively to the following architectures and algorithms:

curve II: the architecture of FIG. 3 and the algorithm provided in WO 03/101064, curve III: the architecture of FIG. 3 and the algorithm of the invention, curve IV: the architecture of FIG. 4 and the algorithm given in WO 03/101064, curve V: the architecture of FIG. 4 and the algorithm of the invention.

The results obtained for the architecture of FIG. 3 do not however allow for the precision faults of the synthesiser.

Table I below brings together the BER data drawn from these curves, at 10, 12.5 and 15 kHz.

TABLE I

| | | | |
|---|---|---|---|
| Bran E | 0.058 | 0.0049 | 0.000205 |
| Frequency offset = 1 kHz and IQ imbalance = −(10) dB/0.1 rad (Curve I) | 0.5 | 0.5 | 0.5 |
| Curve II | 0.059 | 0.0049 | 0.000182 |
| Curve III | 0.058 | 0.0047 | 0.000208 |
| Curve IV | 0.062 | 0.0052 | 0.00023 |
| Curve V | 0.065 | 0.0053 | 0.00022 |

Curves II-V lead one to think that the two algorithms, that of document WO 03/101064 and that according to the invention, are comparable. In fact, these curves show the effectiveness of the adaptive architecture for the two algorithms. Also, what these curves do not show is the superior rapidity of convergence of the algorithm of the invention, which is reflected in the curves of FIGS. 7B and 7C.

Figure 7B:
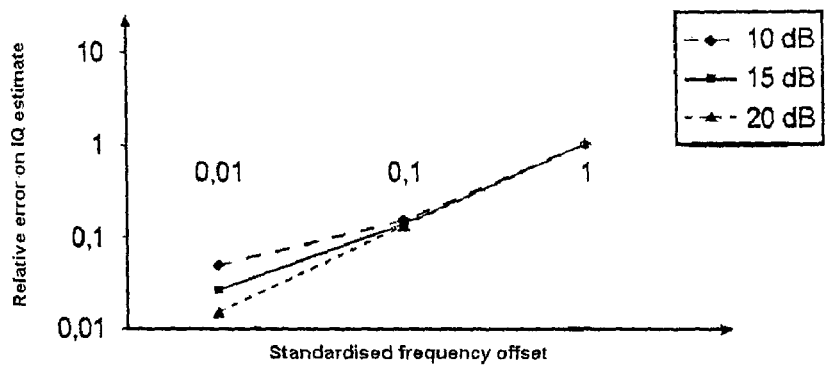
Figure 7C:
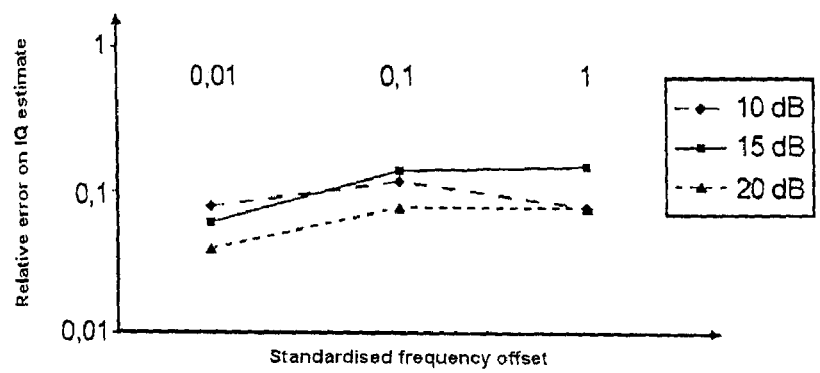

These FIGS. 7B and 7C compare the first estimates of the IQ parameters according to the two criteria considered in the presence of an uncompensated frequency offset. It can be seen that the algorithm for minimising the envelope of the interference signal, according to this present invention, is less sensitive to the presence of a high frequency offset (FIG. 7C) than the algorithm of document WO 03/101064 (FIG. 7B). The fact of considering only the "transitions" of the interference signal limits the impact of the inter-carrier interferences (but renders the algorithm a bit more sensitive to noise).

It is also possible to use two pilot sequences, chosen in such a manner that the transitions due to the IQ imbalances are opposite.

In fact, in order not to overload the frame of a communication by sequences that contain no data, it can be judicious to employ such pilots, used traditionally for channel estimate and fine frequency synchronisation, during frequency offset and of IQ imbalances estimate.

This allows us to simplify the complexity of the frequency offset and IQ imbalances correction and estimate algorithms, since this has very little impact on channel estimate.

For example, it is possible to consider a first pilot composed of a pseudo-random sequence, and a second pilot, identical to the first in the first half of its samples and oppose on its mirror part, such as $p_1$ and $p_2$ below for example:

$$p_1 = \frac{\left[1-1-1+1+1-1+1+1+1-1-1-1+1-1+1+1-1\right]}{\frac{1+j}{\sqrt{2}}} \times$$

-continued $$p_2 = \frac{\left[\underbrace{1-1-1+1+1-1+1+1+1+1+1+1-1+1-1-1+1}_{+}\right] \times}{\frac{1+j}{\sqrt{2}}}$$

Given that a random sequence after FFT gives a blank Gaussian signal, allowing channel estimate over all the frequencies of the OFDM subcarriers, these pilots that include pseudo random sequences are very suitable for the purpose of effecting a channel estimate.

In relation to the previous methods of implementation, the use of the above pilots enable us in particular to simplify the complexity of the IQ imbalances estimate, frequency offset, and channel estimate algorithms.

The invention can be implemented with an adaptive structure, such as that represented in FIG. 3 or FIG. 4. In this case, the adaptive process carried out is identical to that described previously, where the chaining of these operations for synchronisation and compensation of the imperfections can be carried out according to the diagram of FIG. 6A, which is given by way of an example only.

Figure 6B:
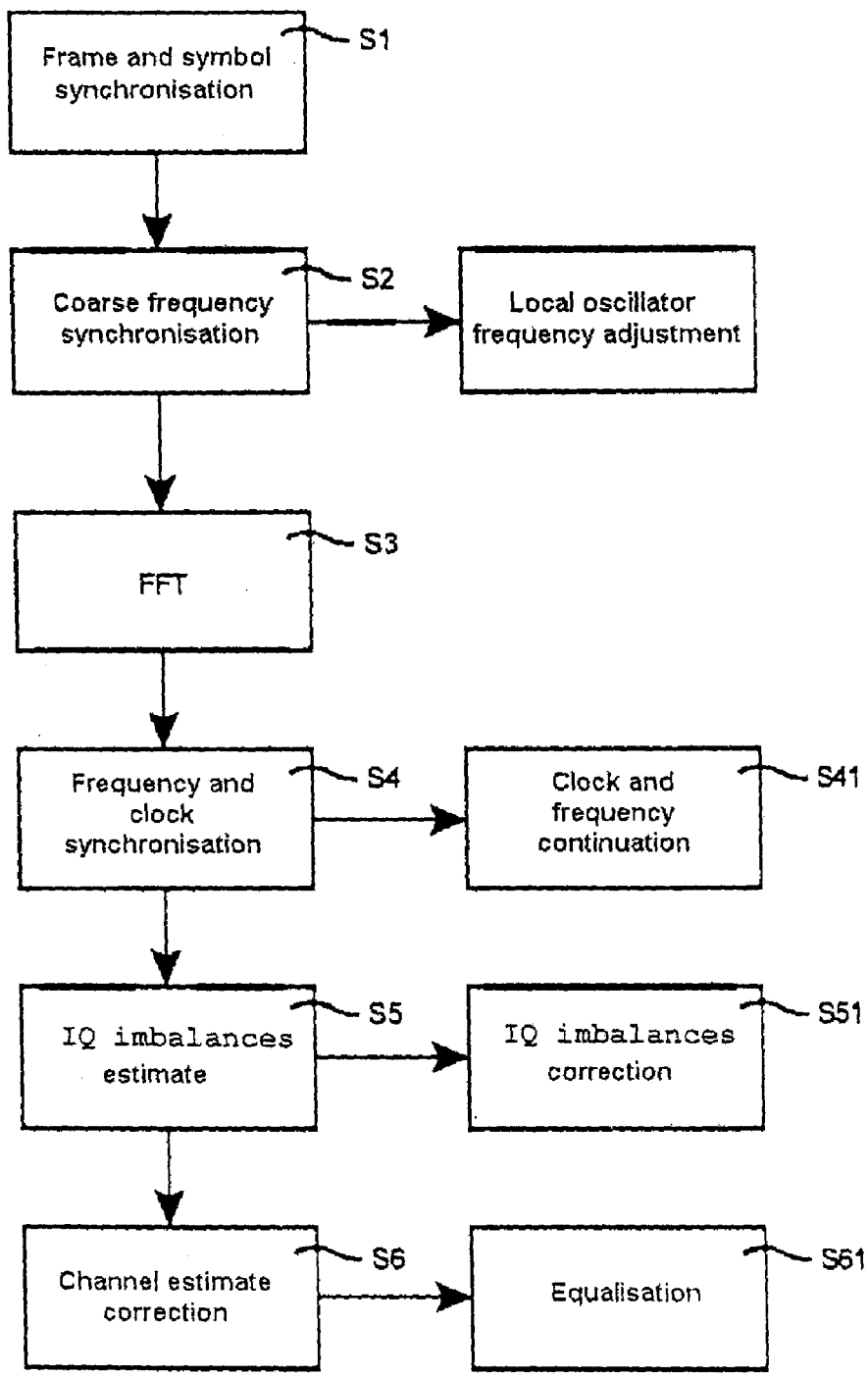

The use of these pilots also enables us to use a reception chain with a non-adaptive structure. Such a structure differs, for example, from those represented in FIGS. 3 and 4 through the fact that the estimates are not updated in estimate blocks 110, 112, 114, 210, 212 and 214. In this case, the operations for synchronisation and compensations of the imperfections can be carried out according to the diagram of FIG. 6B. In relation to the diagram of FIG. 6A, block S6 of FIG. 6B does not loop on block S3 (because the structure is not adaptive).

With such pilots, and if one does not consider the intercarrier interferences which behaves like white noise, we get the following at the output of the FFT step:

$$S_{S_{1,p}} = \frac{\left(\alpha \cdot p_{1,p} \cdot H_p \cdot e^{j \cdot 2\pi \cdot \frac{N-1}{N}(\Delta f \cdot T)} + \beta \cdot p_{1,p}^{*m} \cdot H_p^{*m} \cdot e^{-j \cdot 2\pi \cdot \frac{N-1}{N}(\Delta f \cdot T)}\right) \cdot \sin(\pi(\Delta f \cdot T))}{N \cdot \sin\left(\frac{\pi(\Delta f \cdot T)}{N}\right)}$$

$$S_{S_{2,p}} = \frac{\left(\alpha \cdot p_{2,p} \cdot H_p \cdot e^{j \cdot 2\pi \cdot \frac{N-1}{N}(\Delta f \cdot T)} + \beta \cdot p_{2,p}^{*m} \cdot H_p^{*m} \cdot e^{-j \cdot 2\pi \cdot \frac{N-1}{N}(\Delta f \cdot T)}\right) \cdot \sin(\pi(\Delta f \cdot T))}{N \cdot \sin\left(\frac{\pi(\Delta f \cdot T)}{N}\right)}$$

Therefor, for $$0 \leq p < \frac{N}{2},$$

$p_{1,p} = p_{2,p}$ and $p_{1,p}^{*m} = -p_{2,p}^{*m}$, we have:

$$S_{S_{1,p}} = \left(\begin{array}{l}\alpha \cdot p_{1,p} \cdot H_p \cdot e^{j \cdot 2\pi \cdot \frac{N-1}{N}(\Delta f \cdot T)} + \\ \beta \cdot p_{1,p}^{*m} \cdot H_p^{*m} \cdot e^{-j \cdot 2\pi \cdot \frac{N-1}{N}(\Delta f \cdot T)}\end{array}\right) \cdot \frac{\sin(\pi(\Delta f \cdot T))}{N \cdot \sin\left(\frac{\pi(\Delta f \cdot T)}{N}\right)}$$

$$S_{S_{2,p}} = \left(\begin{array}{l}\alpha \cdot p_{1,p} \cdot H_p \cdot e^{j \cdot 2\pi \cdot \frac{N-1}{N}(\Delta f \cdot T)} - \\ \beta \cdot p_{1,p}^{*m} \cdot H_p^{*m} \cdot e^{-j \cdot 2\pi \cdot \frac{N-1}{N}(\Delta f \cdot T)}\end{array}\right) \cdot \frac{\sin(\pi(\Delta f \cdot T))}{N \cdot \sin\left(\frac{\pi(\Delta f \cdot T)}{N}\right)}$$

And for $$\frac{N}{2} \leq p < N, \; p_{1,p} = -p_{2,p} \text{ and } p_{1,p}^{*m} = p_{2,p}^{*m},$$

we have:

$$S_{S_{1,p}} = \left(\begin{array}{l}\alpha \cdot p_{1,p} \cdot H_p \cdot e^{j \cdot 2\pi \cdot \frac{N-1}{N}(\Delta f \cdot T)} + \\ \beta \cdot p_{1,p}^{*m} \cdot H_p^{*m} \cdot e^{-j \cdot 2\pi \cdot \frac{N-1}{N}(\Delta f \cdot T)}\end{array}\right) \cdot \frac{\sin(\pi(\Delta f \cdot T))}{N \cdot \sin\left(\frac{\pi(\Delta f \cdot T)}{N}\right)}$$

$$S_{S_{2,p}} = \left(\begin{array}{l}-\alpha \cdot p_{1,p} \cdot H_p \cdot e^{j \cdot 2\pi \cdot \frac{N-1}{N}(\Delta f \cdot T)} + \\ \beta \cdot p_{1,p}^{*m} \cdot H_p^{*m} \cdot e^{-j \cdot 2\pi \cdot \frac{N-1}{N}(\Delta f \cdot T)}\end{array}\right) \cdot \frac{\sin(\pi(\Delta f \cdot T))}{N \cdot \sin\left(\frac{\pi(\Delta f \cdot T)}{N}\right)}$$

Since it is equally probable that the interferences arising from the IQ imbalances is added or subtracted, the estimate algorithm for the frequency offset is not affected in relation to the previous embodiment. Thus we get:

$$\Delta f_{est} \cdot T_e = \frac{1}{2\pi} \cdot \frac{N}{N-1} \cdot E\left[\text{angle}(S_{S_{1,p}} p_{1,p}^* p_{2,p} S_{S_{2,p}}^*)\right] \text{ for } 0 \leq p < \frac{N}{2}$$

$$\Delta f_{est} \cdot T_e = \frac{1}{2\pi} \cdot \frac{N}{N-1} \cdot E\left[\text{angle}(S_{S_{1,p}} p_{1,p}^* p_{2,p} S_{S_{2,p}}^*) - \pi\right] \text{ for } \frac{N}{2} \leq p < N$$

Thus, by averaging the frequency offset estimate on all available subcarriers, it is possible to rid oneself of the noise and interference due to the IQ imbalances, and we get a more precise value of the frequency offset.

Then channel estimate can be calculated, dispensing with the errors generated by the IQ imbalances by calculating the mean over the channel estimates obtained for each of the pilots, corrected for the frequency offset. We then get:

for $0 \leq p < \frac{N}{2}$:

$$\hat{H}_p = \frac{1}{2} \frac{p_{1,p}}{\alpha} e^{j \cdot 2\pi \cdot \frac{N-1}{N}(\Delta f \cdot T_e)} \left(\begin{array}{l} S_{S_{1,p}} \frac{N \cdot \sin\left(\frac{\pi(\Delta f_{est} \cdot T_e)}{N}\right)}{\sin(\pi(\Delta f \cdot T_e))} + \\ S_{S_{2,p}} \frac{N \cdot \sin\left(\frac{\pi(2 \times \Delta f_{est} \cdot T_e)}{N}\right)}{\sin(\pi(\Delta f \cdot T_e))} e^{j \cdot 2\pi \cdot \frac{N-1}{N}(\Delta f_{est} \cdot T_e)} \end{array}\right)$$

for $\frac{N}{2} \leq p < N$:

-continued $$\hat{H}_p = \frac{1}{2} \frac{p_{1,p}}{\alpha} e^{j \cdot 2\pi \cdot \frac{N-1}{N} (\Delta f \cdot T_e)} \left( S_{S_1,p} \frac{N \cdot \sin\left(\frac{\pi(\Delta f_{est} \cdot T_e)}{N}\right)}{\sin(\pi(\Delta f_{est} \cdot T_e))} - S_{S_2,p} \frac{N \cdot \sin\left(\frac{\pi(2 \times \Delta f_{est} \cdot T_e)}{N}\right)}{\sin(\pi(\Delta f_{est} \cdot T_e))} e^{j \cdot 2\pi \cdot \frac{N-1}{N} (\Delta f_{est} \cdot T)} \right)$$

We then effect an IQ imbalance estimate by evaluating the β parameter in accordance with the following formulae:

for $0 \le p < \frac{N}{2}$:

$$\beta_{est} = \frac{1}{2} \frac{p_{1,p}^m}{\hat{H}_p^{*m}} e^{j \cdot 2\pi \cdot \frac{N-1}{N} (\Delta f_{est} \cdot T_e)} \left( S_{S_1,p} \frac{N \cdot \sin\left(\frac{\pi(\Delta f_{est} \cdot T_e)}{N}\right)}{\sin(\pi(\Delta f_{est} \cdot T_e))} - S_{S_2,p} \frac{N \cdot \sin\left(\frac{\pi(2 \times \Delta f_{est} \cdot T_e)}{N}\right)}{\sin(\pi(\Delta f_{est} \cdot T_e))} e^{j \cdot 2\pi \cdot \frac{N-1}{N} (\Delta f_{est} \cdot T)} \right)$$

for $\frac{N}{2} \le p < N$:

$$\beta_{est} = \frac{1}{2} \frac{p_{1,p}^m}{\hat{H}_p^{*m}} e^{j \cdot 2\pi \cdot \frac{N-1}{N} (\Delta f \cdot T_e)} \left( S_{S_1,p} \frac{N \cdot \sin\left(\frac{\pi(\Delta f_{est} \cdot T_e)}{N}\right)}{\sin(\pi(\Delta f_{est} \cdot T_e))} + S_{S_2,p} \frac{N \cdot \sin\left(\frac{\pi(2 \times \Delta f_{est} \cdot T_e)}{N}\right)}{\sin(\pi(\Delta f_{est} \cdot T_e))} e^{j \cdot 2\pi \cdot \frac{N-1}{N} (\Delta f_{est} \cdot T)} \right)$$

This estimate can also be averaged over N subcarriers.

It is also possible to calculate an estimate of α by using the formula that relates $\alpha_{est}$ and $\beta_{est}$:

$$\alpha_{est} = \sqrt{1 - \text{Im}\{\beta_{est}\}^2} - j \frac{\text{Re}\{\beta_{est}\}\text{Im}\{\beta_{est}\}}{\sqrt{1 - \text{Im}\{\beta_{est}\}^2}}$$

The data symbols can therefore be compensated for the IQ imbalances before the FFT step by:

$$s_3(k) = \frac{\alpha_{est}^* s_2(k) - \beta_{est} s_2^*(k)}{|\alpha_{est}|^2 - |\beta_{est}|^2}$$

for the IQ imbalances, and $s_4(k) = s_3(k) e^{-j*2\pi*\Delta f_{est}*k*T_e}$ for the frequency offset One can therefore jointly and simply correct channel estimate and the data of the IQ imbalances and frequency offset by:
 a frequency offset estimate,
 and a channel estimate,
 an IQ imbalance estimate,
 and a sequential or simultaneous correction of the data symbols before the FFT step.

The IQ imbalance estimate algorithm, combined with the use of a first pilot composed of a pseudo-random sequence, and a second pilot that is identical to the first in the first half of its samples and opposite on its mirror part, has been tested for an OFDM system with 128 subcarriers.

The theoretical data are as follows:

Gain imbalance=0.1 => $Re(\beta)$=0.0995

Phase imbalance=0.1 => $Im(\beta)$=−0.0998

The following table represents the sensitivity of the IQ imbalance estimate in relation to the noise of the propagation channel. The simulation is carried out for a propagation channel with selective fading.

| SNR dB | Re(β) estimate | Im(β) estimate | Relative error (%) |
| --- | --- | --- | --- |
| −5 | 0.081 | −0.033 | 49.2 |
| 0 | 0.113 | −0.109 | 11.58 |
| 5 | 0.106 | −0.109 | 7.97 |
| 10 | 0.103 | −0.106 | 5.03 |
| 15 | 0.102 | −0.104 | 3.45 |
| 20 | 0.101 | −0.102 | 1.87 |
| 25 | 0.101 | −0.101 | 1.35 |
| 30 | 0.101 | −0.1 | 1.07 |

Figure 7D:
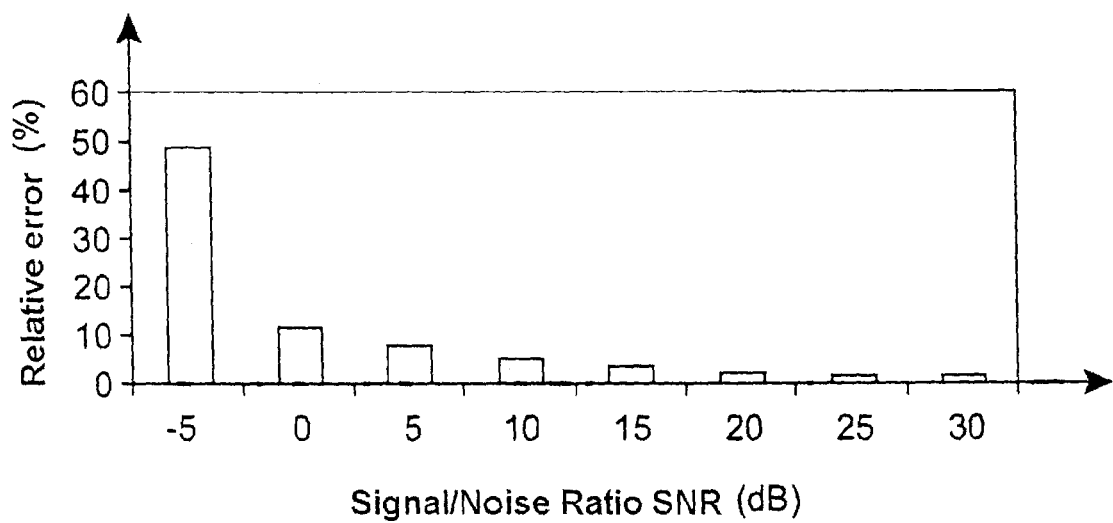
FIG. 7D represents the results of simulating a method according to the invention.

FIG. 7D represents the sensitivity of the IQ imbalances estimate in relation to the noise of the propagation channel. In this figure, it can be seen, for example, that for a signal-to-noise ratio of between 10 and 20 dB, the relative error is between about 5% and 2%, which shows the quality of the estimate carried out.

The results show that we have a robust solution for the algorithm in relation to the noise of the channel, whatever the propagation channel. The results obtained after correction, in terms of binary error rate, are also very good, since after estimate and correction we have the results obtained for a system that is now free of damage.

The invention applies generally to all multi-carrier radio receivers, and in particular in the context of local wireless networks (WLAN 802.11, Hiperlan II, of digital radio and video broadcast (DAB, DVB), fourth-generation mobile telephone systems.

Figure 8:
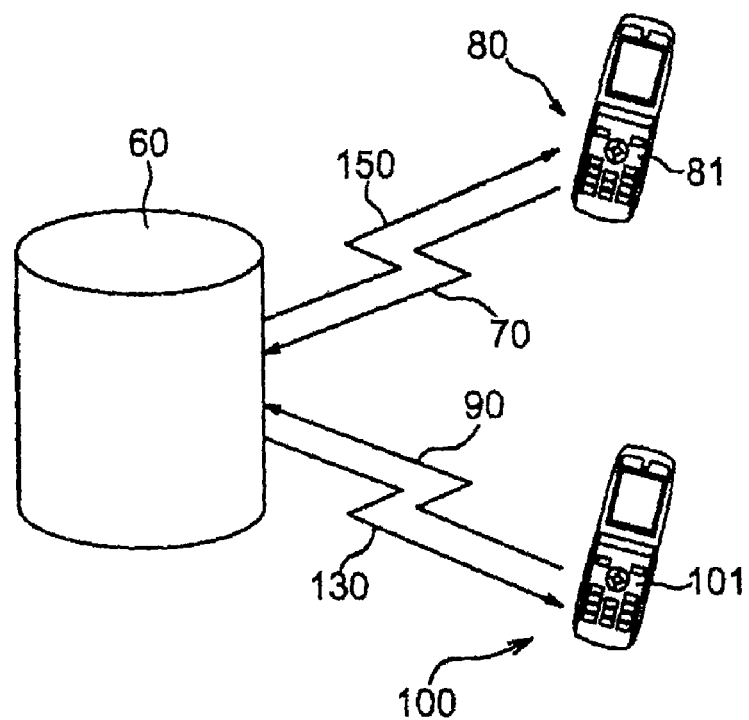
FIGS. 8 and 9 represent structures of a system for the broadcasting of messages on mobile telephone devices and a diagram of the components of a mobile telephone device.
Figure 9:
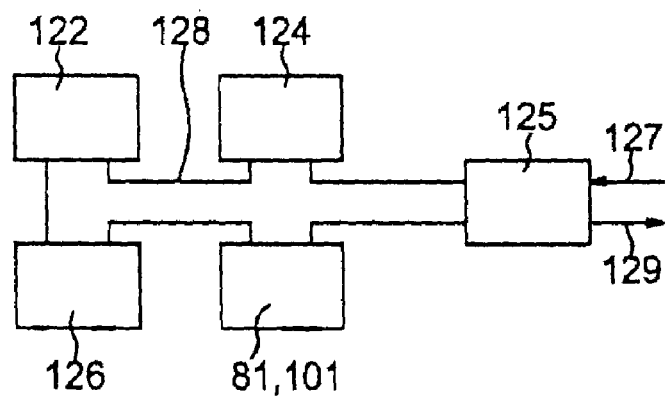

As far as this last application is concerned, a mobile device and a transmission system implementing the invention will be described with reference to FIGS. 8 and 9.

The system consists of a mobile telephone system (MTS) 60, composed of a network server and a transmission infrastructure, of the radio type for example, and a system of wireless mobiles or portable receiving devices, mobile telephones 80, 100 for example, associated with the network.

Messages 130, 150 are sent to the portable devices 80, 100, and the latter are able to re-transmit information 70, 90 in return. Each mobile communication appliance offers a structure, as illustrated in FIG. 9, and is equipped with a microprocessor and memory zones.

The assembly includes at least one processor 122, a quantity of RAM memories 124 (for the storage of data), and ROM memories 126 (for the storage of program instructions, for example). These various elements are linked by a bus 128.

A peripheral element, such as a keyboard (indicated by references 81 and 101 in FIG. 8), allow a user to enter data, in response to a message displayed on its viewing screen for example.

Other peripheral elements can be used in order to effect the input of data, such as a voice-activated control device or a touch-screen for example.

The data can also be entered by using a combination of peripherals such as those indicated above by way of an example.

Reference 125 refers to management means for inputs 127 and outputs 129.

Each appliance can also be considered as implementing the functions described above with reference to FIG. 3, 4, 6A or 6B, or to one of the methods according to the invention as described above.

Data relating to an operating system are stored in a memory zone of each mobile appliance.

In the case of a mobile telephone, it is also possible to add a SIM card (GSM) or USIM card (UMTS) and means to read this card.

Program data in order to effect correction of the IQ imbalance and frequency and clock offsets can also be stored in a memory zone of each mobile appliance.

A mobile device such as devices 81 and 101, has storage means that are used to store data relating to the processing mentioned above, and in particular the various parameters used in the above formulae.

The calculation of each correction of the RSIB imbalance can be carried out by each mobile device itself, when it receives pilots. Contrary to the method described in document WO 03/101064, the method according to the invention does not require two consecutive sequences, and only one such sequence (that is one OFDM symbol) suffices.

In relation to the known techniques and in particular that of document WO 03/101064, the invention offers the following advantages.

To begin with, it employs either pilots or learning sequences without distinction. It is not necessary to permanently have two long learning sequences.

The invention uses the reception of these known sequences directly after the Fourier Transform step, and does not require channel estimate (even so, there can be a channel estimate if desired).

Also, the architecture of the invention is adaptive.

According to the invention, the preferred IQ imbalances estimate criterion is based on minimising the envelope of the interference signal, and this single IQ imbalances estimate criterion can be used regardless of the value of the frequency offset, that is more than or less than 15 kHz.

Finally, the channel estimate correction is no longer necessary after the first frame.

By choosing pilots in such a manner that the transitions due to the IQ imbalances are opposite, it is possible to perform simple and effective compensation of the IQ imbalances and frequency offsets. Most transmission systems of the OFDM type can incorporate, without difficulty, the algorithms that work with these pilots.

The invention claimed is:

1. A method for correction of an IQ imbalance of a receiver experiencing at least one of a frequency and a clock offset, the method including:
   receiving a signal with the receiver;
   converting the signal received with the receiver from an analog signal to a digital signal;
   transforming the signal received with the receiver from a time domain to a frequency domain;
   determining an IQ imbalance estimate based on imbalance residual variations that remain following a previous determination of the IQ imbalance estimate; and
   subsequent to converting the signal to the digital signal and before transforming the signal from the time domain to the frequency domain, correcting the frequency and/or clock offsets of the IQ imbalance according to the IQ imbalance estimate, in order to obtain a corrected estimate of the IQ imbalance.

2. Method according to claim 1, wherein the IQ imbalance estimate is determined based on pilots or learning sequences that result in transitions due to opposite IQ imbalances.

3. Method according to claim 1, wherein the IQ imbalance estimate is determined based on two pilots or learning sequences.

4. Method according to claim 1, wherein the IQ imbalance estimate is determined based on two pilots or learning sequences, the pilots comprising at least first and second pilots $p_1$ and $p_2$, wherein the first pilot $p_1$ comprises a pseudo-random sequence and a value of the second pilot in a first half of samples of the second pilot $p_2$ is identical to a value of the first pilot $p_1$ in a first half of samples of the first pilot, and the value of the second pilot is opposite to the value of the first pilot $p_1$ in the second half of the samples.

5. Method according to claim 1, wherein the imbalance residual variations are calculated as a function of an interference signal of carriers and mirror subcarriers.

6. Method according to claim 5, wherein the imbalance residual variations are calculated to minimize an envelope of the interference signal.

7. Method according to claim 5, wherein the imbalance residual variations are calculated as a function of a characteristic parameter $|E|^2$ of an envelope of said interference signal.

8. Method according to claim 7, wherein only transition regions of the interference signal are considered in calculating the imbalance residual variations.

9. Method according to claim 8, further comprising:
   measuring complex frequency samples of a pilot adjacent to the transition regions,
   comparing the complex frequency samples to samples of the pilot, and extracting the characteristic parameter $|E|^2$ of the envelope of the interference signal.

10. Method according to claim 7, the characteristic parameter $|E|^2$ being equal or proportional to:

$$|E(n)|^2 = \left| \frac{(S_5(n)p(n+1) - S_5(n+1)p(n))p_m(n)}{(p(n+1)p_m(n) - p(n)p_m(n+1))S_5(n)^{m*}} \right|^2$$

where $S_5(n)$ is the received signal on subcarrier "n", $S_{5m}(n)$ is the received signal on the mirror subcarrier, $p(n)$ is the value of a pilot on subcarrier "n" and $p_m(n)$ is a pilot on the mirror subcarrier.

11. Method according to claim 7, the characteristic parameter $|E|^2$ being equal or proportional to:

$$|E(n)|^2 = \left| \frac{\begin{array}{c}(S_5(n)p(n+1) - S_5(n+1)p(n))p_m(n) - \\ (S_5(n+1)p(n+2) - S_5(n+2)p(n+1))p_m(n+1)\end{array}}{\begin{array}{c}S_5(n)^{m*}(p(n+1)p_m(n) - p(n)p_m(n+1)) - \\ S_{5m}(n+1)^*(p(n+2)p_m(n+1) - p(n+1)p_m(n+2))\end{array}} \right|^2$$

where $S_5(n)$ is the received signal on the subcarrier "n", $S_{5m}(n)$ is the received signal on the mirror subcarrier, $p(n)$ is the value of a pilot on subcarrier "n" and $p_m(n)$ is a pilot on the mirror subcarrier.

12. Method according to claim 7, the IQ imbalance estimates are corrected in relation to the previous determination of the IQ imbalance estimate, and proportionally to $\delta|E|^2/\delta\beta'$, where $\beta'$ represents a residual IQ imbalance.

13. Method according to claim 1, the imbalance residual variations are obtained from a fast Fourier transformation performed on the signal in the receiver.

14. Method for correction of a signal s2 received and digitised by a wireless receiver, the method including a method for correction of an IQ imbalance to obtain a corrected IQ imbalance according to claim 1, and correcting the signal S2 according to the corrected IQ imbalance.

15. Method according to claim 14, wherein the signal s2 is corrected before said transforming of the signal from the time domain to the frequency by a Fourier transform operation.

16. Method according to claim 1 further comprising performing a coarse frequency synchronization before a first IQ imbalance estimate is determined.

17. Method according to claim 1 further comprising performing a fine frequency offset correction before a first IQ imbalance estimate is determined.

18. Method according to claim 1 further comprising: determining a channel estimate and; and correcting the channel estimate according to both the frequency and clock offsets and the IQ imbalance.

19. Method according to claim 1, wherein said transforming the signal from the time domain to the frequency domain comprises performing a Fast Fourier Transform operation on the signal in the receiver.

20. Method according to claim 1, further comprising determining a channel estimate, wherein said correcting both of the frequency and clock offsets is based on the channel estimate.

21. Method according to claim 1, wherein the correcting of the frequency and clock offsets is based on two pilots or learning sequences, wherein a first pilot or learning sequence $p_1$ and a second pilot or learning sequence $p_2$ are consecutive in time or with interleaved data symbols.

22. Method according to claim 1 further comprising determining a channel estimate.

23. Method according to claim 22 further comprising correcting the channel estimate based on the IQ imbalance.

24. Method according to claim 22 further comprising correcting the channel estimate based on the at least one of the clock and frequency offsets.

25. Non-transitory computer-readable medium, capable of being read by a computer system, comprising computer-executable instructions that, when executed, implement a method according to claim 1.

26. A method for correction of an IQ imbalance of a receiver experiencing at least one of a frequency and a clock offset, the method including:
 determining an IQ imbalance estimate based on pilots or learning sequences that result in transitions due to opposite IQ imbalances, and
 subsequent to converting the signal to the digital signal and before transforming the signal from the time domain to the frequency domain, correcting the at least one of the frequency and clock offsets and of the IQ imbalance according to the IQ imbalance estimate to obtain a corrected estimate of the IQ imbalance.

27. Method according to claim 26, wherein the IQ imbalance estimate is determined based on two pilots or learning sequences.

28. Method according to claim 26, wherein the IQ imbalance estimate is based on two pilots or learning sequences, $p_1$ and $p_2$, a first of the pilots or learning sequences $p_1$ comprising a pseudo-random sequence and a second of the pilots or learning sequences $p_2$ that is identical to the first of the pilots or learning sequences $p_1$ in a first half of samples and opposite to the first of the pilots or learning sequences $p_1$ in a second half of samples.

29. A receiver device for correcting an IQ imbalance, comprising:
 means for receiving a signal;
 means for converting the signal from an analog signal to a digital signal;
 means for transforming the signal from a time domain to a frequency domain;
 means for determining an IQ imbalance estimate, based on imbalance residual variations that remain since a preceding estimate of the IQ imbalance,
 means for obtaining a corrected estimate of the IQ imbalance by correcting frequency and clock offsets and the IQ imbalance based on the IQ imbalance estimate subsequent to conversion of the signal from the analog signal to the digital signal and before transformation of the signal from the time domain to the frequency domain.

30. Device according to claim 29, wherein the means for determining the IQ imbalance estimate comprises means for conducting pilots, or learning sequences, that result in transitions due to opposite IQ imbalances.

31. Device according to claim 29, wherein the means for determining the IQ imbalance estimate determines the IQ imbalance estimate based on two pilots, or learning sequences.

32. Device according to claim 29, wherein the means for determining the IQ imbalance estimate comprises means for determining the IQ imbalance estimate based on two pilots or learning sequences, the two pilots or learning sequences comprising a first pilot or learning sequence $p_1$ and a second pilot or learning sequence $p_2$, the first pilot or learning sequence $p_1$ comprising a pseudo-random sequence, wherein the second pilot or learning sequence $p_2$ is identical to the first pilot or learning sequence $p_1$ in a first half of samples and opposite to the first pilot or learning sequence $p_1$ in a second half of samples.

33. Device according to claim 29, wherein the imbalance residual variations are calculated according to an interference signal of carriers and mirror subcarriers.

34. Device according to claim 33, wherein the imbalance residual variations are calculated according to a characteristic parameter $|E|^2$ of an envelope of the interference signal.

35. Device according to claim 34, wherein the imbalance residual variations are calculated based only on transitions of the interference signal.

36. Device according to claim 35 further comprising:
 means for measuring a value of pilot frequency complex samples adjacent to the transitions,
 means for comparing the value of the pilot frequency complex samples to a value of samples of a transmitted pilot and for calculating the characteristic parameter $|E|^2$ of the envelope of the interference signal.

37. Device according to claim 34, wherein the IQ imbalance estimate is corrected, relative to the preceding estimate of the IQ imbalance, proportionally to $$\frac{\partial |E|^2}{\partial \beta'},$$

where $\beta'$ represents the imbalance residual variation.

38. Receiver device according to claim 34, including means for correcting the IQ imbalance of a signal s2, received and digitised by a wireless receiver.

39. Device according to claim 38, wherein the means for transforming the signal performs a Fourier transform operation on the signal s2 to transform the signal s2 into the frequency domain after the IQ imbalance of the signal s2 is corrected.

40. Device according to claim 29, wherein the imbalance residual variations are calculated according based on a criterion for minimising an envelope of an interference signal.

41. Device according to claim 29, wherein the imbalance residual variations are based on the signal transformed into the frequency domain by performance of a fast Fourier transform in the receiver.

42. Device according to claim 29, wherein the means for determining the IQ imbalance estimate determines a first IQ imbalance estimate after a coarse frequency synchronization operation is performed.

43. Device according to claim 29, wherein the means for determining the IQ imbalance estimate determines a first IQ imbalance estimate after a fine frequency offset correction operation is performed.

44. Device according to claim 29 further comprising means for determining a channel estimate and correcting the channel estimate based on the frequency and clock offsets and the IQ imbalance.

45. Device according to claim 29, wherein the means for transforming the signal transforms the signal from the time domain to the frequency domain by performing a fast Fourier transform operation on the signal to obtain a resulting signal s4, and wherein the means for obtaining the corrected estimate of the IQ imbalance corrects the frequency and clock offsets based on the resulting signal S4 obtained by performing the fast Fourier transform operation in the receiver.

46. Device according to claim 29 further comprising means for determining a channel estimate, wherein correction of the frequency and clock offsets is based on the channel estimate.

47. Device according to claim 29, wherein correction of the frequency and clock offsets is based on two pilots or learning sequences, the two pilots or learning sequences comprising a first pilot or learning sequence $p_1$ and a second pilot or learning sequence $p_2$, wherein each of the first and second pilot or learning sequences comprise values that are consecutive in time or comprise interleaved data symbols.

48. Device according to claim 29 further comprising means for determining a channel estimate.

49. Device according to claim 48 further comprising means for correcting the channel estimate based on the IQ imbalance.

50. Device according to claim 48 further comprising means for correcting the channel estimate based on the clock and/or frequency offsets.

51. Receiver device comprising means for correction of an IQ imbalance, including:
  means for receiving a signal;
  means for converting the signal from an analog signal to a digital signal;
  means for transforming the signal from a time domain to a frequency domain;
    means for determining an IQ imbalance estimate based on one or more pilots or learning sequences that result in transitions caused by opposite IQ imbalances,
    means for obtaining a corrected IQ imbalance estimate by correcting the frequency and clock offsets and the IQ imbalance, based on the IQ imbalance estimate subsequent to the converting of the signal to the digital signal domain and before the transforming of the signal from the time domain to the frequency domain.

52. Device according to claim 51, wherein the IQ imbalance estimate is derived from two pilots or learning sequences.

53. Device according to claim 51, wherein the IQ imbalance estimate is derived from two pilots or learning sequences, comprising a first pilot or learning sequence $p_1$ and a second pilot or learning sequence $p_2$, wherein the first pilot or learning sequence $p_1$ comprises a pseudo-random sequence of first samples, and wherein the second pilot or learning sequence $p_2$ comprises a collection of second samples, wherein a first half of the second samples are identical to a first half of the first samples and a second half of the second samples are equal in value, but opposite in sign to a second half of the first samples.

\* \* \* \* \*

UNITED STATES PATENT AND TRADEMARK OFFICE
CERTIFICATE OF CORRECTION

| | | |
|---|---|---|
| PATENT NO. | : 7,852,973 B2 | Page 1 of 1 |
| APPLICATION NO. | : 11/720000 | |
| DATED | : December 14, 2010 | |
| INVENTOR(S) | : Dominique Morche and Cedric Dehos | |

It is certified that error appears in the above-identified patent and that said Letters Patent is hereby corrected as shown below:

In Column 15, line 52 please delete " $\frac{1}{2\pi} \text{angle}(E[\hat{H}_{1,p}\hat{H}^*_{2,p}]) = \Delta fT + 2K\frac{\delta t}{T}$ " and insert -- $\frac{1}{2\pi} \text{angle}\left(E\left[\hat{H}_{1,p}\hat{H}^*_{2,p}\right]\right) = \Delta fT + 2K\frac{\delta t}{T}$ --, therefore.

In Column 25, line 26, please delete the "," after "Claim 1" and before the word "further".

In Column 26, line 11, please delete the "," after the word "estimate" and before the word "based".

Signed and Sealed this
Eighth Day of March, 2011

David J. Kappos
*Director of the United States Patent and Trademark Office*